US008630497B2

(12) United States Patent
Badawy et al.

(10) Patent No.: US 8,630,497 B2
(45) Date of Patent: Jan. 14, 2014

(54) ANALYZING A SEGMENT OF VIDEO

(75) Inventors: Wael Badawy, Calgary (CA); Hazem Gomaa, Calgary (CA)

(73) Assignee: Intelliview Technologies Inc., Calgary (CA)

( * ) Notice: Subject to any disclaimer, the term of this patent is extended or adjusted under 35 U.S.C. 154(b) by 945 days.

(21) Appl. No.: 11/945,979

(22) Filed: Nov. 27, 2007

(65) Prior Publication Data

US 2009/0136141 A1 May 28, 2009

(51) Int. Cl.
*G06K 9/62* (2006.01)
*G06K 9/00* (2006.01)
*H04N 7/18* (2006.01)
*G04B 19/30* (2006.01)

(52) U.S. Cl.
USPC ........... 382/225; 382/103; 382/104; 382/105; 348/143; 368/68

(58) Field of Classification Search
USPC ........ 382/103–105, 255; 348/143; 368/68, 69
See application file for complete search history.

(56) References Cited

U.S. PATENT DOCUMENTS

| | | | |
|---|---|---|---|
| 5,329,368 A | 7/1994 | Plotke | |
| 5,485,611 A * | 1/1996 | Astle | 1/1 |
| 6,130,707 A | 10/2000 | Koller | |
| 6,493,041 B1 | 12/2002 | Hanko | |
| 6,535,639 B1 | 3/2003 | Uchihachi | |
| 7,127,120 B2 | 10/2006 | Hua | |
| 7,143,352 B2 | 11/2006 | Divakaran | |
| 2003/0076417 A1 * | 4/2003 | Thomas et al. | 348/169 |
| 2003/0152363 A1 * | 8/2003 | Jeannin et al. | 386/68 |
| 2007/0033170 A1 * | 2/2007 | Sull et al. | 707/3 |
| 2009/0219300 A1 * | 9/2009 | Peleg et al. | 345/630 |

FOREIGN PATENT DOCUMENTS

EP 1 486 928 A2 12/2004

OTHER PUBLICATIONS

Ängeslevä, J., and R. Cooper, "Last Clock," IEEE Computer Graphics and Applications 25(1):20-23, Jan./Feb. 2005.
Baykal, I.C., and G.A. Jullien, "Detection of Defects in Textures With Alignment Error for Real-Time Line-Scan Web Inspection Systems," 45th IEEE International Midwest Symposium on Circuits and Systems (MWSCAS-2002), Tulsa, Okla.. Aug. 4-7, 2002, vol. 3, pp. III-292-III-295.
Baykal, I.C., et al., "On the Use of Hash Functions for Defect Detection in Textures for In-Camera Web Inspection Systems," IEEE International Symposium on Circuits and Systems (ISCAS 2002), Scottsdale, Ariz., May 26-29, 2002, vol. 5, pp. V-665-V-668.

(Continued)

*Primary Examiner* — Amara Abdi
(74) *Attorney, Agent, or Firm* — Christensen O'Connor Johnson Kindness PLLC

(57) ABSTRACT

There is disclosed a quick and efficient method for analyzing a segment of video, the segment of video having a plurality of frames. A reference portion is acquired from a reference frame of the plurality of frames. Plural subsequent portions are then acquired from a corresponding subsequent frame of the plurality of frames. Each subsequent portion is then compared with the reference portion, and an event is detected based upon each comparison. There is also disclosed a method of optimizing video including selectively storing, labeling, or viewing video based on the occurrence of events in the video. Furthermore, there is disclosed a method for creating a video summary of video which allows a used to scroll through and access selected parts of a video. The methods disclosed also provide advancements in the field of video surveillance analysis.

19 Claims, 19 Drawing Sheets

(56) References Cited

OTHER PUBLICATIONS

Ngo, C.-W., et al., "Video Partitioning by Temporal Slice Coherency," IEEE Transactions on Circuits and Systems for Video Technology 11(8):941-953, Aug. 2001.

Otsuka, I., et al. "A Highlight Scene Detection and Video Summarization System Using Audio Feature for a Personal Video Recorder," Technical Report TR2005-011, © Mitusbishi Electric Research Laboratories, Inc., Cambridge, Mass., Dec. 2005, 4 pages.

Tian, Y.-L., and A. Hampapur, "Robust Salient Motion Detection With Complex Background for Real-Time Video Surveillance," Proceedings of the IEEE Workshop on Motion and Video Computing (WACV/Motion '05), Breckenridge, Colo., Jan. 2005, vol. 2, pp. 30-35.

Viégas, F.B., et al., "Artifacts of the Presence Era: Using Information Visualization to Create an Evocative Souvenir," IEEE Symposium on Information Visualization (INFOVIS 2004), Austin, Tex., Oct. 10-12, 2004, pp. 105-111.

Kim, H., et al., "An Efficient Graphical Shot Verifier Incorporating Visual Rhythm," Proceedings of the Sixth IEEE International Conference on Multi-Media Computing and Systems (ICMCS), Florence, Italy, Jun. 7-11, 1999, pp. 827-834.

\* cited by examiner

ANALYZING A SEGMENT OF VIDEO

TECHNICAL FIELD

This disclosure relates to methods of analyzing and optimizing video footage, as well as methods of summarizing video.

BACKGROUND

U.S. Pat. No. 6,535,639 discloses a method of summarizing a video sequence. Currently there is no easy way of quickly and efficiently looking through surveillance footage for important events. Additionally, there is no simple method of storing or labeling important video scenes from a segment of video.

SUMMARY

A method for analyzing a segment of video is disclosed, the segment of video having a plurality of frames. A reference portion is acquired from a reference frame of the plurality of frames. Plural subsequent portions are acquired, each subsequent portion being acquired from a corresponding subsequent frame of the plurality of frames. Each subsequent portion is then compared with the reference portion, and an event is detected based upon each comparison.

A method of summarizing a segment of video is also disclosed. A portion is extracted from each frame of a plurality of frames from a segment of video are. A visual summary is then created having an arrangement of the portions of the plurality of frames.

BRIEF DESCRIPTION OF THE FIGURES

Embodiments will now be described with reference to the figures, in which like reference characters denote like elements, by way of example, and in which.

DETAILED DESCRIPTION

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

Described herein are methods for processing sequences of images in video. The video may comprise regular video, infra-red, heat or thermal images, and may further comprise the generation of a visual representation for event summarization, retrieval and reporting. Additionally, any gray level video may be analyzed. The proposed technique allows users to quickly retrieve the set of images that contains events from a stored video in short time. A motion based summary may be provided which acts as an event detector that analyzes a video sequence, for example, for the fast motion of a car or particular movement in a specific location. A feature based summary may also be provided that is used to locate frames containing specific objects of different color or shape.

Figure 1:
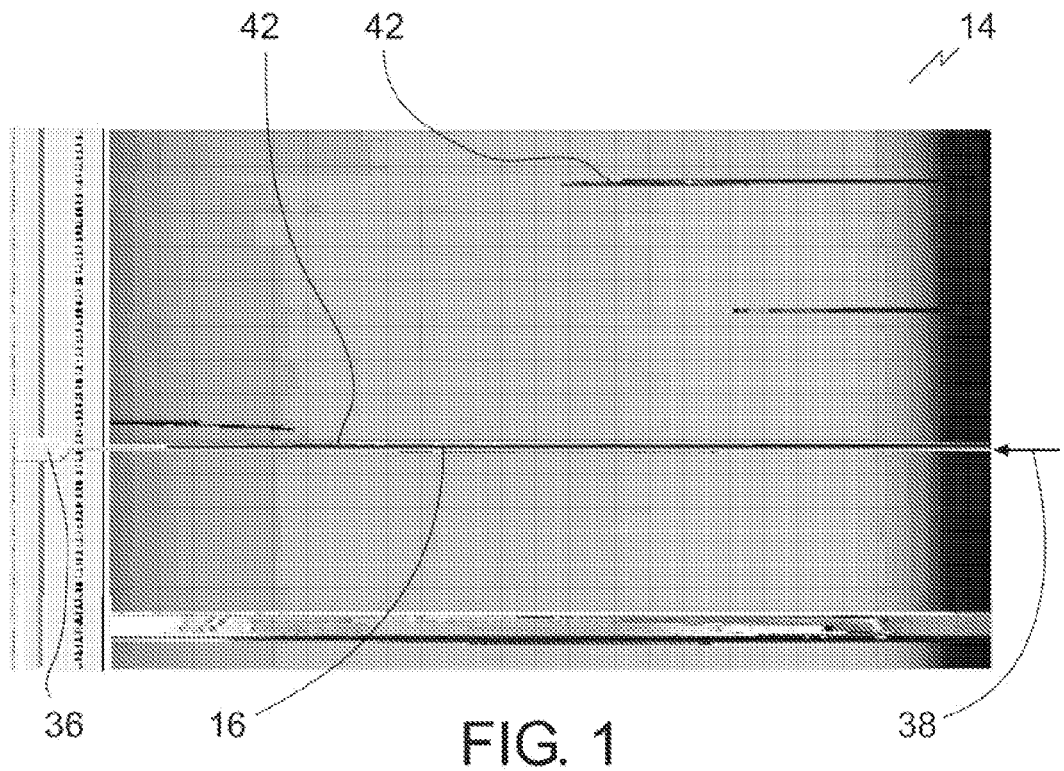
FIG. 1 is a view illustrating a visual summary of a segment of video, with a frame selected.
Figure 17:
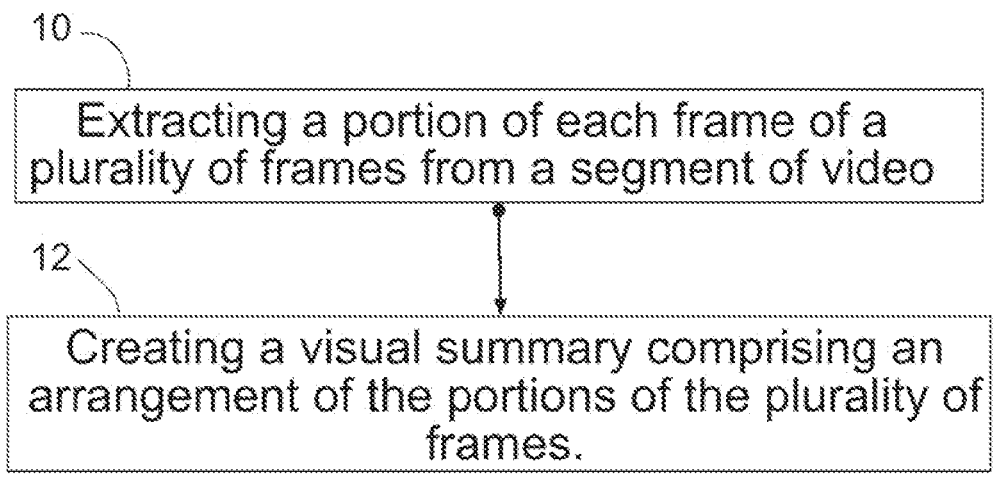
FIG. 17 is a flow diagram of a method of summarizing a segment of video.

Referring to FIG. 17, a method of analyzing a segment of video is illustrated, the segment of video having a plurality of frames. In step 10, a portion is extracted from each frame of the plurality of frames from the segment of video. In step 12, a visual summary 14 (shown in FIG. 1) is created having an arrangement of the portions of the plurality of frames. Portions are arranged in successive order, although in alternative embodiments they may be arranged in other suitable orders. The portions may be arranged, for example, from left to right, right to left, top to bottom, or bottom to top, in succession. Additionally, the frames from the plurality of frames may be taken at regular intervals from the segment of video, and may not include every frame from the segment of video. An exemplary plurality of frames may include five or ten frames for every one second of video from the segment of video. Referring to FIG. 1, visual summary 14 is illustrated in detail. Visual summary 14 has been created by taking a horizontal line portion as the portion of each frame of the plurality of frames, and arranging the horizontal line portions. Alternatively, other types of portions may be taken from each frame of the plurality of frames, for example a circular portion, a rectangular portion, or any other suitably shaped portion. Additionally, each portion may be acquired as at least part of one or more lines. These may include a horizontal, vertical, diagonal, or curved line. Alternatively, multiple lines of differing or similar orientation may be taken as each portion. An example of this may be to have a horizontal line portion and a vertical line portion make up each portion. Furthermore, multiple portions may be taken for each corresponding frame.

Figure 2:
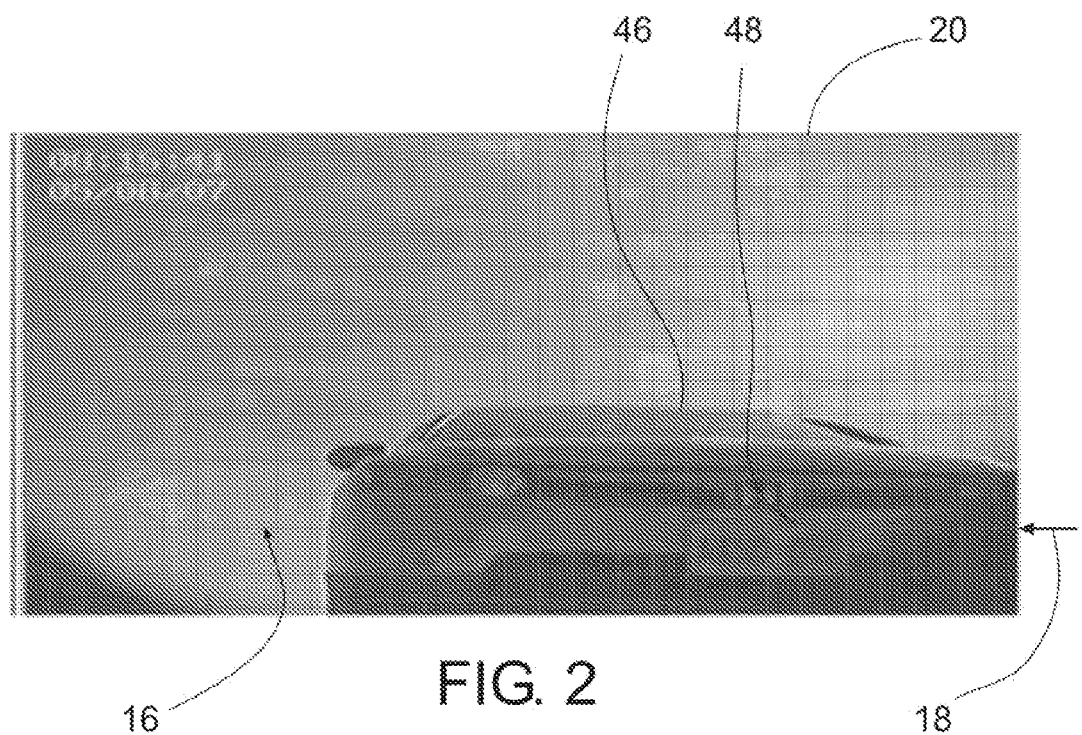
FIG. 2 is a view illustrating the frame that corresponds to the frame selection from the visual summary of FIG. 1, the frame displaying a car passing through the field of view.
Figure 4:
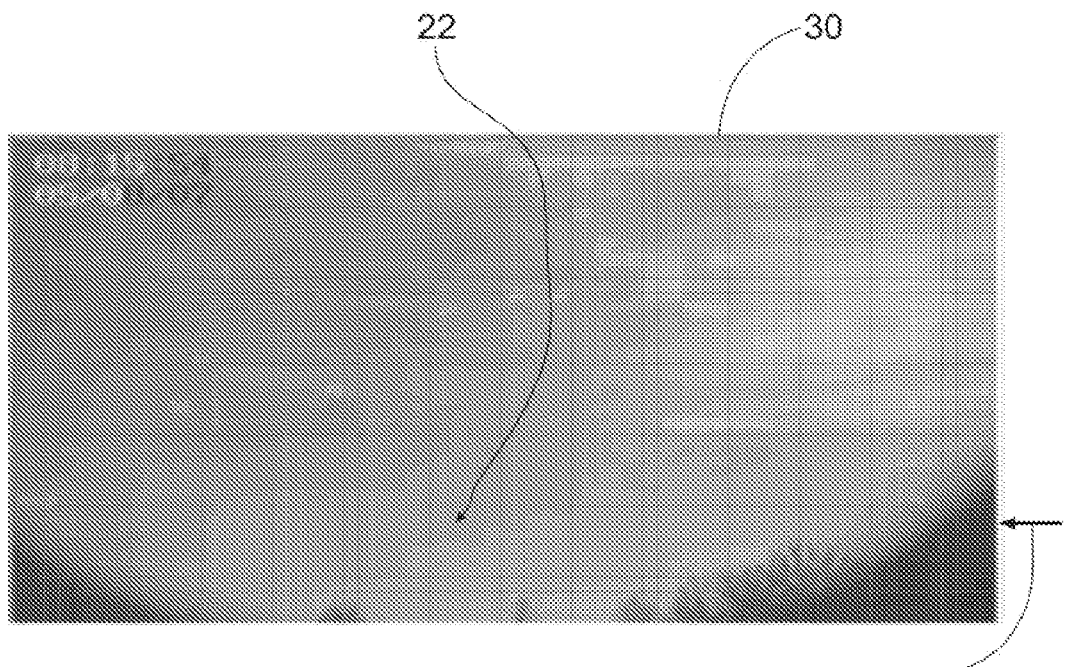
FIG. 4 is a view illustrating the frame that corresponds to the frame selection from the visual summary of FIG. 3, the frame displaying the background.
Figure 6:
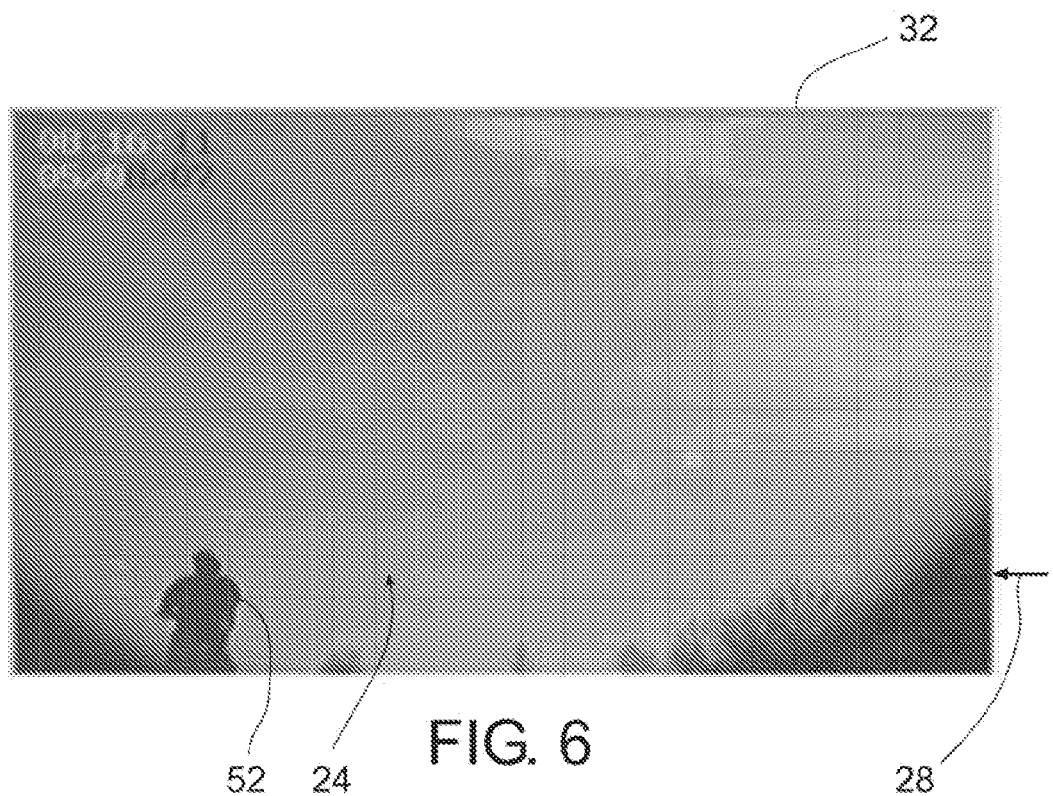
FIG. 6 is a view illustrating the frame that corresponds to the frame selection from the visual summary of FIG. 5, the frame displaying a cyclist passing through the field of view.

Referring to FIG. 2, an exemplary horizontal line portion 16 is taken at a position 18 of a frame 20. Referring to FIGS. 4, and 6, corresponding horizontal line portions 22 and 24 are taken at positions 26 and 28, of frames 30 and 32, respectively. Referring to FIGS. 2, 4, and 6, positions 18, 26, and 28 all correspond to the same location on each respective frame. Referring to FIG. 1, each portion taken from each frame of the plurality of frames is acquired at the same location on each respective frame. Alternatively, portions may be taken from different locations on each respective frame, or a plurality of locations. In addition, the segment of video may be captured using a stationary video source. This is advantageous when each portion is acquired from the same location on each respective frame, because each portion will then correspond to the same field of view in the video, allowing relative events to be detected. Additionally, surveillance cameras often have fixed parameters (pan-tilt-zoom) with a fixed background, giving the resulting video summary images coherency.

Figure 18:
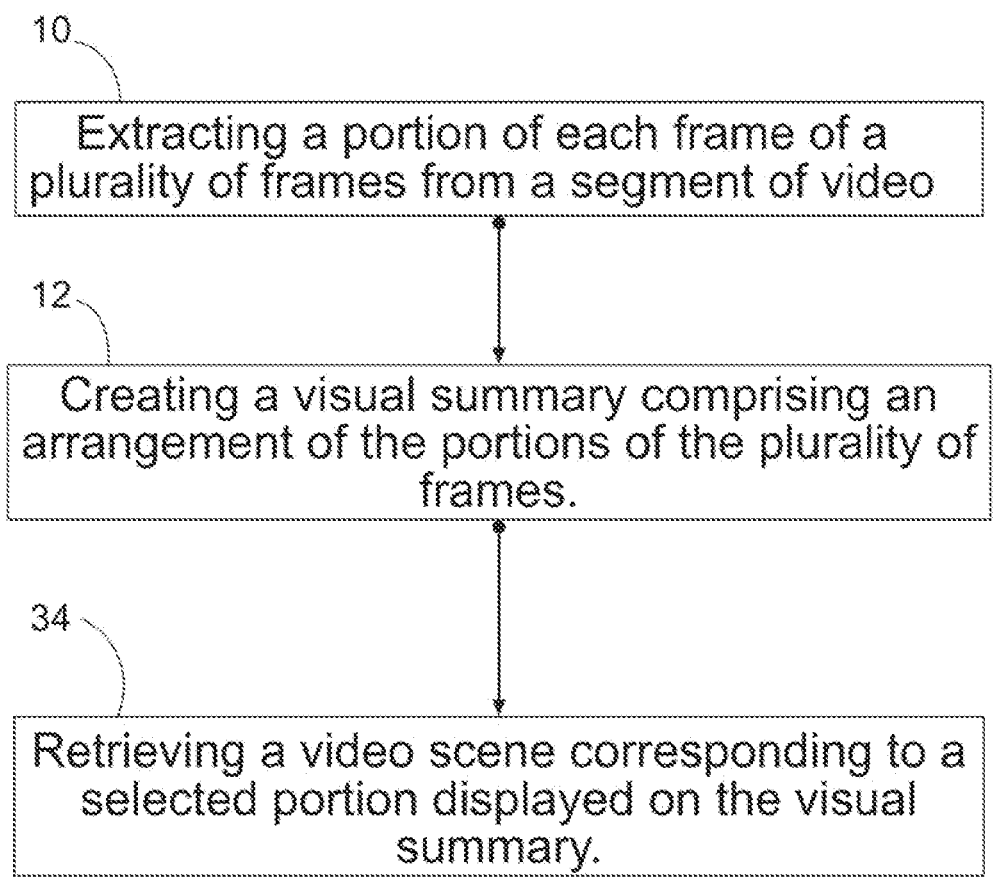
FIG. 18 is a flow diagram of a method of summarizing a segment of video and retrieving a video scene.

Referring to FIG. 18, another embodiment of the method of analyzing a segment of video shown in FIG. 17 is illustrated. In step 34, a video scene is retrieved corresponding to a selected portion displayed on the visual summary. Referring to FIG. 1, video summary 14 comprises a scene selector 36 through which individual portions can be selected, and viewed. Scene selector 36 allows a user to visualize the video content and select a location of the segment of video to view. The portions selected may correspond to a video scene, or a single frame. Scene selector 36 provides the user with the ability to retrieve video scenes which contain events by simply using a scroll bar type interface to choose specific lines on video summary 14. In the embodiment shown in FIG. 1, scene selector 36 is oriented at a position 38 corresponding to horizontal line portion 16 (shown in FIG. 2). Scene selector 36 then selects horizontal line portion 16, bringing up frame 20 (shown in FIG. 2). Referring to FIG. 2, frame 20 is now shown in full. The segment of video may now be watched from frame 20 onwards. This method is very rapid since there is no actual processing by the computer.

Figure 19:
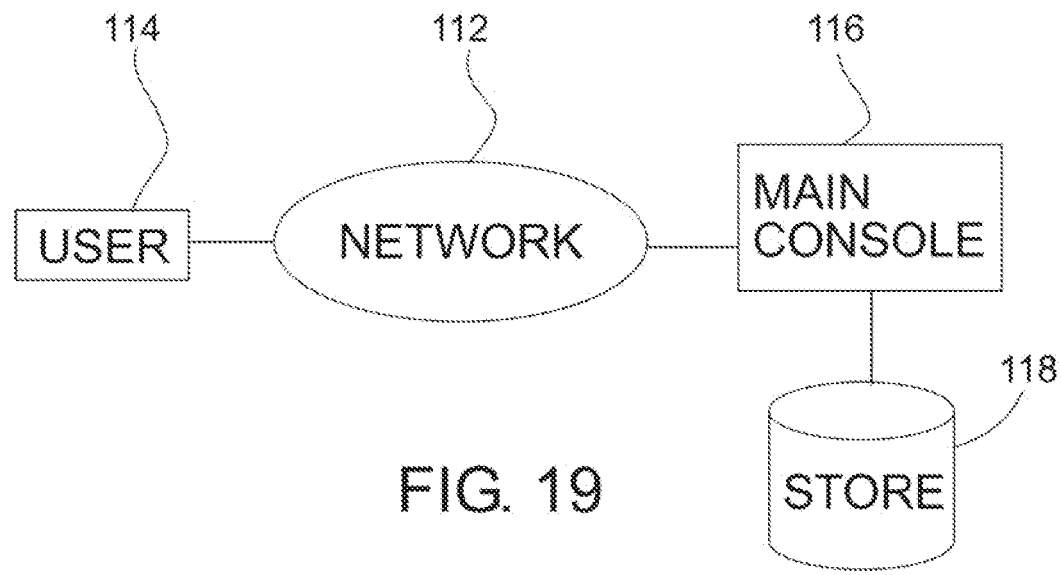
FIG. 19 is a schematic view of a networked video analysis system.

Referring to FIG. 19, video summary 14 may be sent over a network 112 to a user console 114. A user may use user console 114 to access a main console 116. Main console 116 may be connected to a data storage device 118 that contains saved video data. The user may select a segment of video to be analyzed corresponding to a certain camera, or a certain location under surveillance. Main console 116 analyzes a segment of video stored in data storage device 118, and creates a visual summary according to the embodiments described herein. The visual summary is then sent to user console 114 where it may be displayed. The user can peruse the video summary, and select certain video scenes or frames of interest from the segment of video to be sent to the user, instead of the entire segment of video. Main console 116 then retrieves the corresponding video scene or frames from data storage device 118 and transfers them to user console 114 over network 112. Additionally, user console 114 may receive video scenes from the segment of video via streaming data or downloaded data from main console 116. Network 112 may be any type of network, including for example the internet, a wide area network, or a local area network. This method is very rapid since there is little actual processing by either of consoles 114 or 116. Additionally, the traffic overhead required to send a whole video is reduced.

Figure 3:
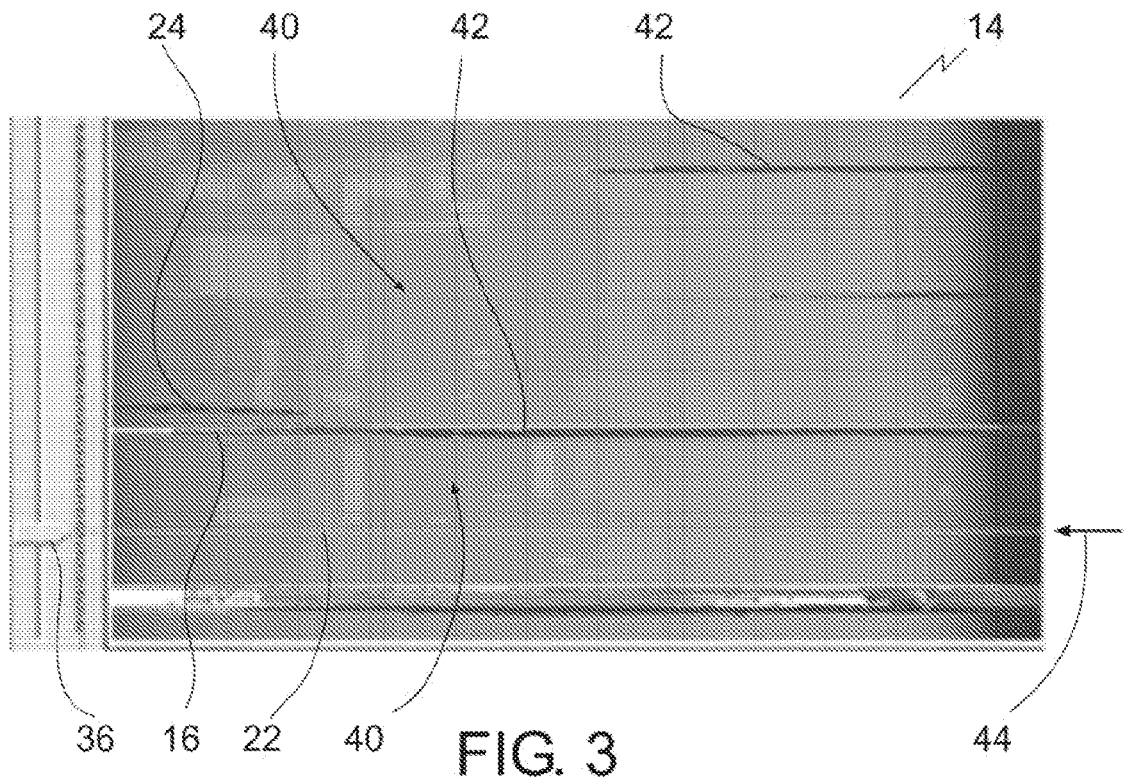
FIG. 3 is a view illustrating the visual summary of FIG. 1 with another frame selected.

Referring to FIGS. 17 and 18, the methods shown may be used as part of a method for video surveillance. Referring to FIGS. 1-6, the methods shown in FIGS. 17 and 18 are being carried out as part of a method of monitoring a roadway. This method may be used to count cars for traffic analysis. Alternatively, this monitoring may be employed as part of part of a speed trap. The segment of video used to create video summary 14 shows two minutes of video recorded from a speed bump camera. Referring to FIG. 3, video summary 14 illustrates many large areas 40 containing consistent pixel distributions, spliced with areas 42 where there are obvious changes in the pixel distributions. Areas 40 with consistent and unchanging pixel distributions correspond to frames that show background scenes, where no events are estimated by the portions to be occurring. Areas 42, which are often short, horizontal segments in the installation shown, correspond to frames in which an event is estimated to be occurring. An example of an event may include a car or a pedestrian passing through the field of view of the camera. Because each portion is taken from the same location on the corresponding frame, the location should be carefully determined to be a suitable location which will show a change in pixel distribution upon the occurrence of an event.

Figure 20:
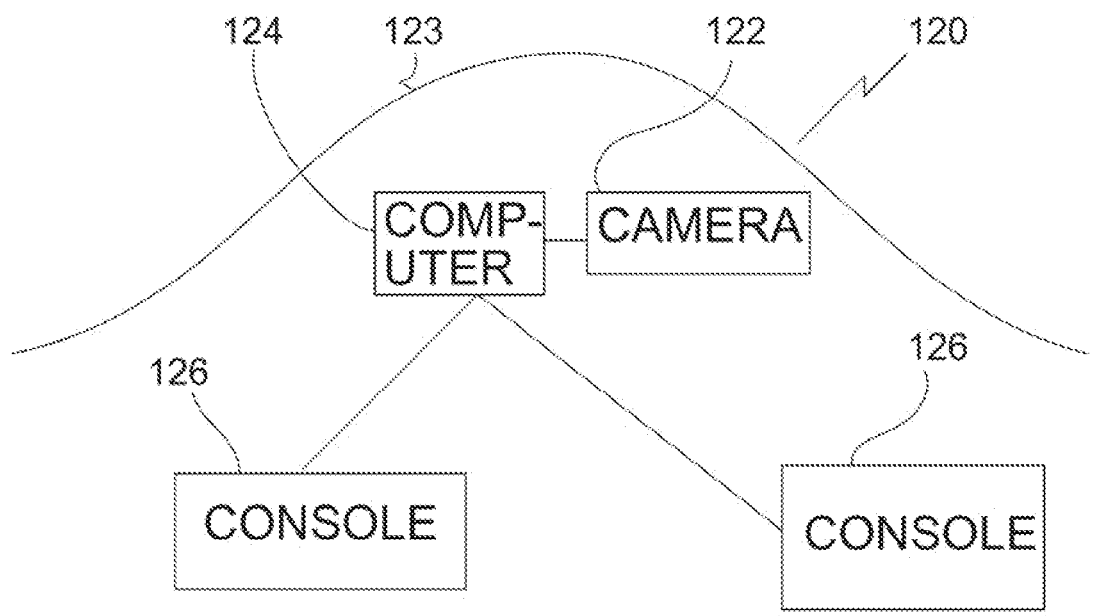
FIG. 20 is a schematic view of a surveillance system in a parking lot.

Alternatively, the methods described in FIGS. 17-18 may be carried out as part of a method of monitoring a parking lot. Referring to FIG. 20, a surveillance system 120 for a parking lot is shown. A camera 122 is positioned within a speed bump 123 for recording traffic from the parking lot. Alternatively, camera 122 may be provided mounted in a raised position, or on a wall or roof of the parking lot. Camera 122 sends video data to a computer box 124. Computer box may be located within speed bump 123, or alternatively may be located elsewhere. The video data may be sent by camera 122 in segments or as a live feed. Computer box 124 receives the video data and creates a visual summary discussed in the embodiments described herein. Computer box 124 may also extract the location in each frame of a license plate of a car, and may adjust the location of each extracted portion accordingly. Alternatively, computer box 124 may extract portions of each frame that contain an image of the license plate. Computer box 124 may send the video summary, as well as selected frames, video scenes corresponding to selected frames, or extracted portions containing license plate numbers, to a console 126. Console 126 may analyze the processed video data from computer box 124 to extract the license plate number of a car passing over camera 122 using optical character recognition software. Additionally, console 126 or computer box 124 may selectively store frames or video scenes depicting events, such as a car passing by, in a data storage device (not shown) similar to data storage device 118 discussed for FIG. 19. Multiple consoles 126 may be connected to computer box 124. A surveillance setup may function using multiple systems 120, all coordinating in tandem. This way, different exits/entrances of the parking lot may be monitored and logged, in order for security control, for counting vehicles or keeping track of cars within the parking lot. In addition, multiple systems 120 may be used to derive charges for parking for each car that enters the parking lot. Charges may be based on the length of stay, deduced from the time elapsed between entry and exit as detected by systems 120.

The consoles 114, 116 and 126, and the computer box 124, may be any computing device now known or later developed that are configured to carry out the processes described here. The computing devices may for example be personal computers programmed to carry out the described processes, or may be application specific devices that are hard wired to carry out the described processes. Communications between the various apparatus may use any suitable communication links such as wires or wireless that supply a sufficient data rate. The required communication links and general purpose computing devices required for implementing the method steps described here after suitable programming are already known and do not need to be described further.

Figure 5:
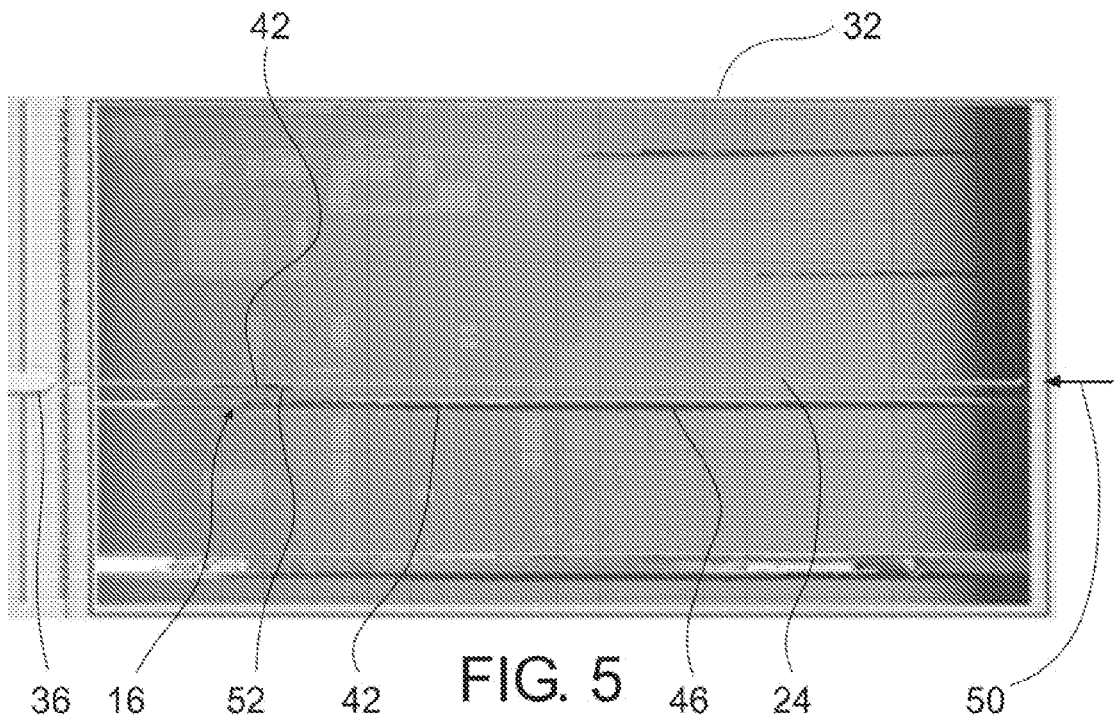
FIG. 5 is a view illustrating the visual summary of FIG. 1 with a further frame selected.

Referring to FIG. 3, scene selector 36 is oriented at a position 44 which corresponds to horizontal line portion 22 of frame 30. Horizontal line portion 22 is taken from one of areas 40, corresponding to frames that show background scenes. Referring to FIG. 4, frame 30 shows a background scene. Referring to FIG. 1, scene selector 36 is oriented at position 38 which corresponds to horizontal line portion 16 of frame 20 (shown in FIG. 2). Horizontal line portion 16 is taken from one of areas 42 which denote frames in which an event is occurring. Referring to FIG. 2, the event occurring is a car 46 passing overhead. A license plate 48 is readably visible, and can be used to identify the owner of car 46. Referring to FIG. 5, scene selector 36 is oriented at a position 50 which corresponds to horizontal line portion 24 of frame 32. Horizontal line portion 24 is taken from one of areas 42 which denote frames in which an event is occurring. Referring to FIG. 6, the event occurring is a cyclist 52 passing through the field of view of the camera. Referring to FIG. 5, it may be possible to determine a difference in events (for example, distinguishing that car 46 as opposed to cyclist 52 is passing through) by the relative change in pixel distribution shown in area 42. For example, horizontal line portion 24 shows a much smaller change (corresponding to cyclist 52) than horizontal line portion 16 (corresponding to car 46).

Figure 7:
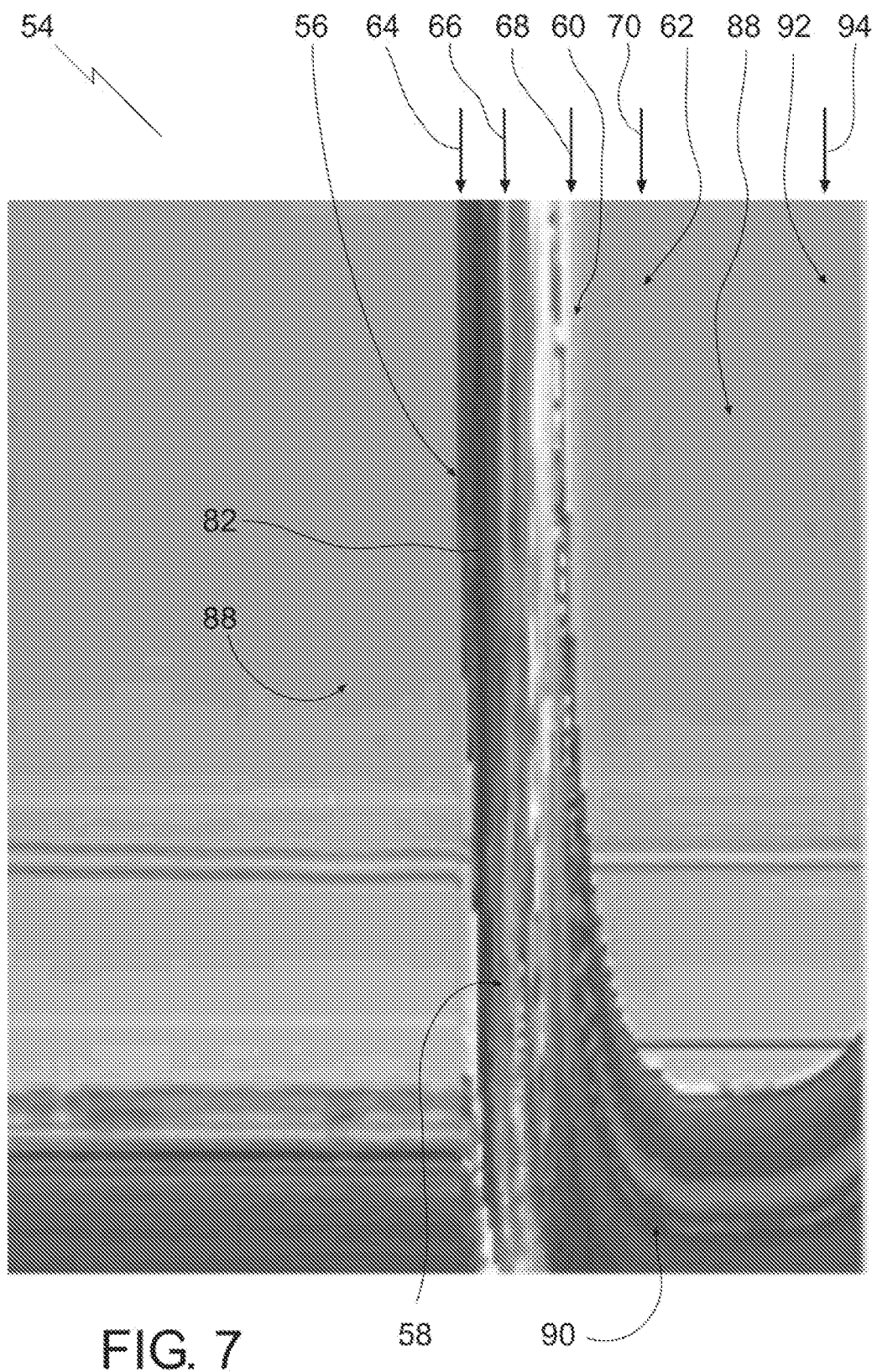
FIG. 7 is a view illustrating a visual summary of a segment of video.
Figure 8:
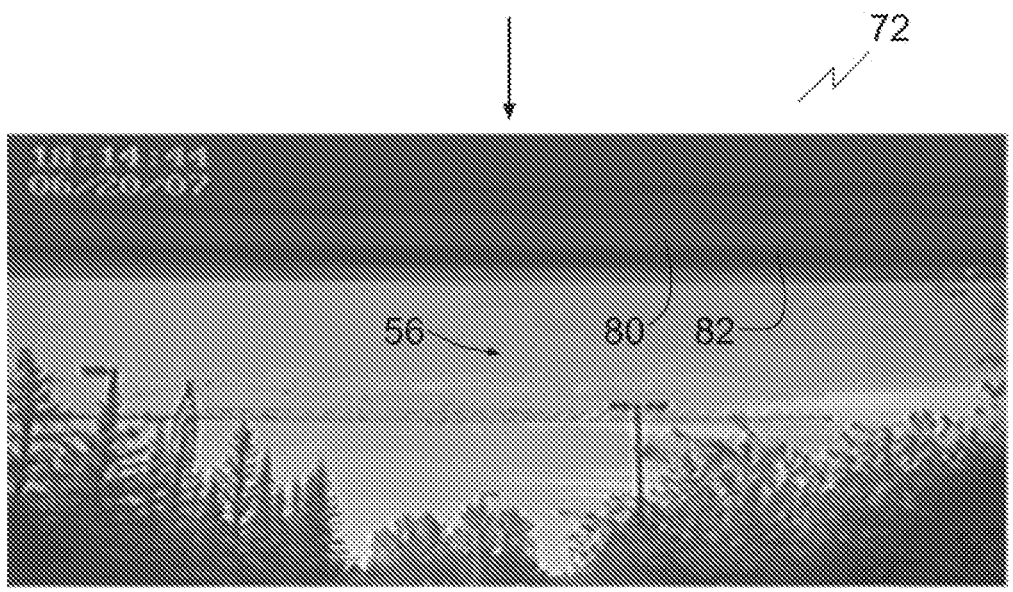
FIG. 8 is a view illustrating a frame corresponding to a selection made from the visual summary of FIG. 7, the frame illustrating a car beginning to pass overhead.
Figure 9:
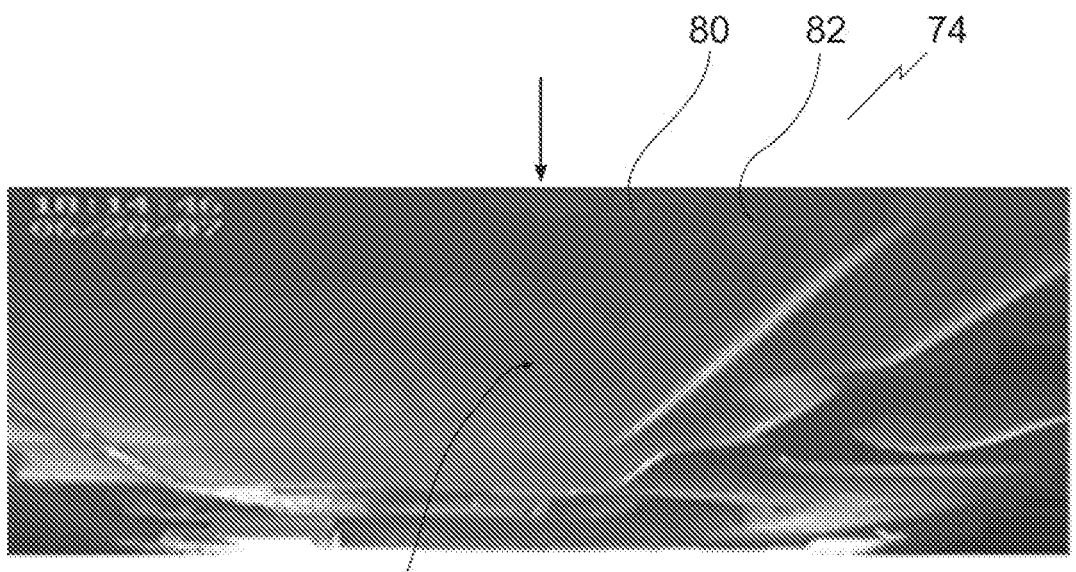
FIG. 9 is a view illustrating another frame corresponding to a selection made from the visual summary of FIG. 7, the frame illustrating a car passing overhead.
Figure 10:
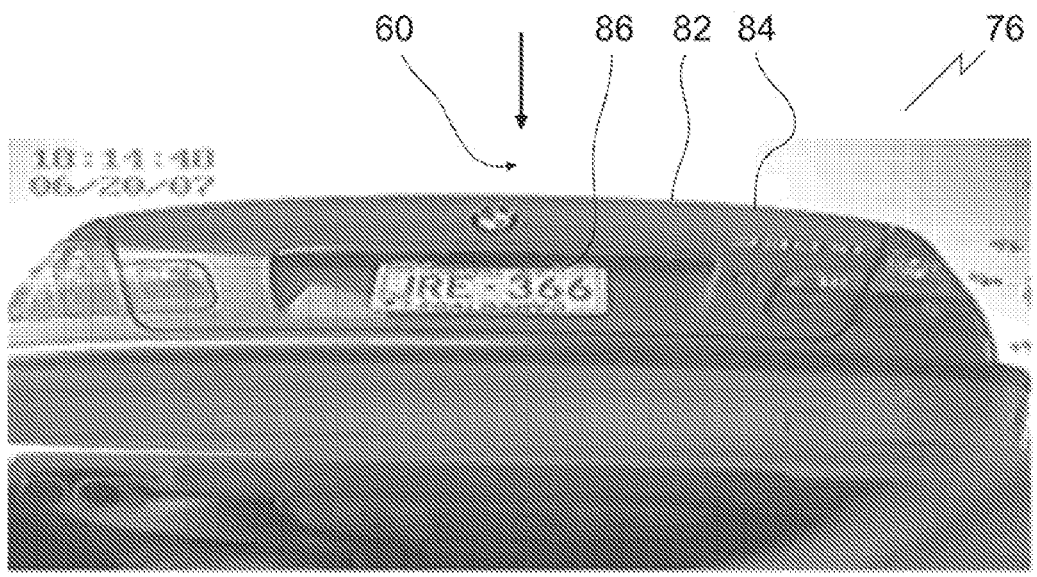
FIG. 10 is a view illustrating a further frame corresponding to a selection made from the visual summary of FIG. 7, the frame illustrating a car that has passed overhead.
Figure 11:
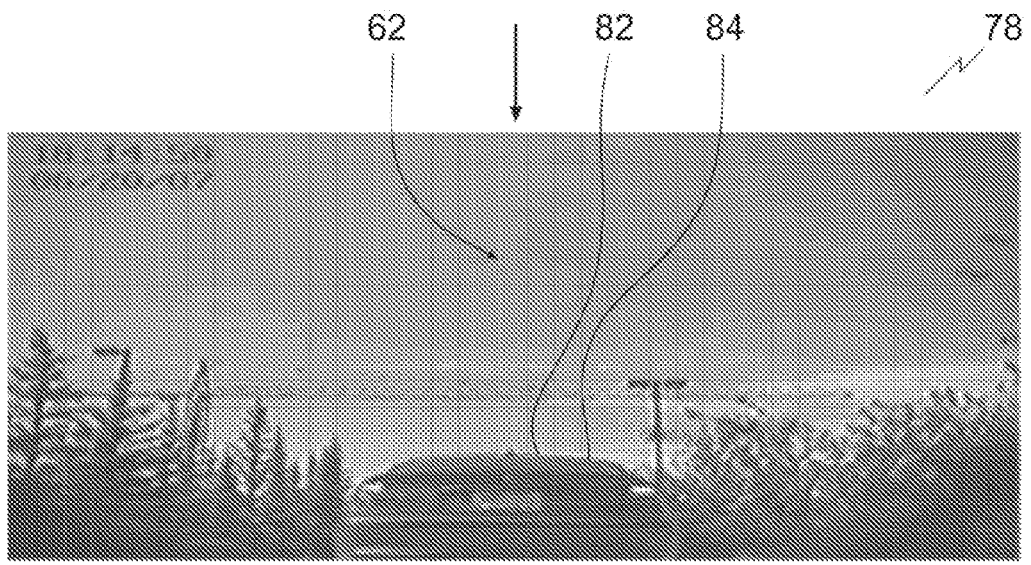
FIG. 11 is a view illustrating an even further frame corresponding to a selection made from the visual summary of FIG. 7, the frame illustrating a car that has is now moving out of the field of view.

Referring to FIG. 7, a visual summary 54 is shown made up of vertical line portions arranged in succession from left to right. Each vertical line portion has been taken from a corresponding frame of a plurality of frames from a segment of video. The segment of video was recorded from a camera in the road. Visual summary 54 follows the same principles as visual summary 14, with the exception that vertical line portions are extracted in place of horizontal line portions. Four vertical line portions 56, 58, 60 and 62 are denoted at positions 64, 66, 68, and 70, respectively, the corresponding frames 72, 74, 76, and 78, of which are displayed in FIGS. 8, 9, 10, and 11, respectively. Each vertical line portion in visual summary 54 is taken along center of each respective frame. Referring to FIG. 8, frame 72, from which vertical line portion 56 was taken, is illustrated. An underbody 80 of a car 82 is visible at the top of frame 72, as car 82 is beginning to pass overtop of the camera's field of view. Referring to FIG. 9, frame 74, from which vertical line portion 58 was taken, is illustrated. Underbody 80 now completely covers the field of view of the camera, as car 82 is overtop of the camera. Referring to FIG. 10, frame 76, from which vertical line portion 60 was taken, is illustrated. A rear end 84 of car 82 is now visible, as car 82 has passed overtop of the camera. Also visible is a license plate 86. Referring to FIG. 11, frame 78, from which vertical line portion 62 was taken, is illustrated. Rear end 84 is now less visible as car 82 is further away from the camera, and moving steadily away. Referring to FIG. 7, background areas 88 can be distinguished from event areas 90 in which events are occurring, as described previously for the embodiment shown in FIGS. 1-6. It is possible to infer characteristics of events occurring in areas 90 from a study of visual summary 54. For example, the direction of travel of car 82 can be inferred from looking at the shape of area 90. Vertical line portion 56 shows the dark pixels of car 82 only in the upper part of vertical line portion 56. Vertical line portion 58 then shows the dark pixels of car 82 completely obscuring background area 88. This suggests that car 82 has passed overtop of the camera, and is traveling in a direction oriented away from the camera. At vertical line portion 62, the dark pixels of car 82 are now only visible in the bottom portion of vertical line portion 62. However, in a later vertical line portion 92 denoted at position 94, the dark pixels of car 82 extend higher up the bottom portion of vertical line portion 92 than in vertical line portion 62, suggesting that car 82 is backing up and now heading in a direction of travel towards the camera. Another example of characteristics that may be inferred from visual summary 54 is the speed of car 82. Depending on the length of time that car 82 is visible, as evidenced by the number of frames that it appears in, the speed of car 82 can be calculated. For example, if a horizontal line portion is used from a speed bump camera (similar to what is used in FIGS. 1-6), then a car passing overhead will form a roughly triangular pixel profile in the video summary. If a car is traveling at a faster speed, the corresponding triangular shape will be flatter and more squashed, due to the car entering and leaving the field of view very quickly. In contrast, a slower traveling car will create a longer, and larger triangular profile. Computer software may be implemented to infer the speed of a car based upon the pixel profile displayed in the video summary. The video summary itself may be viewed through a console located in a police vehicle.

Figure 12:
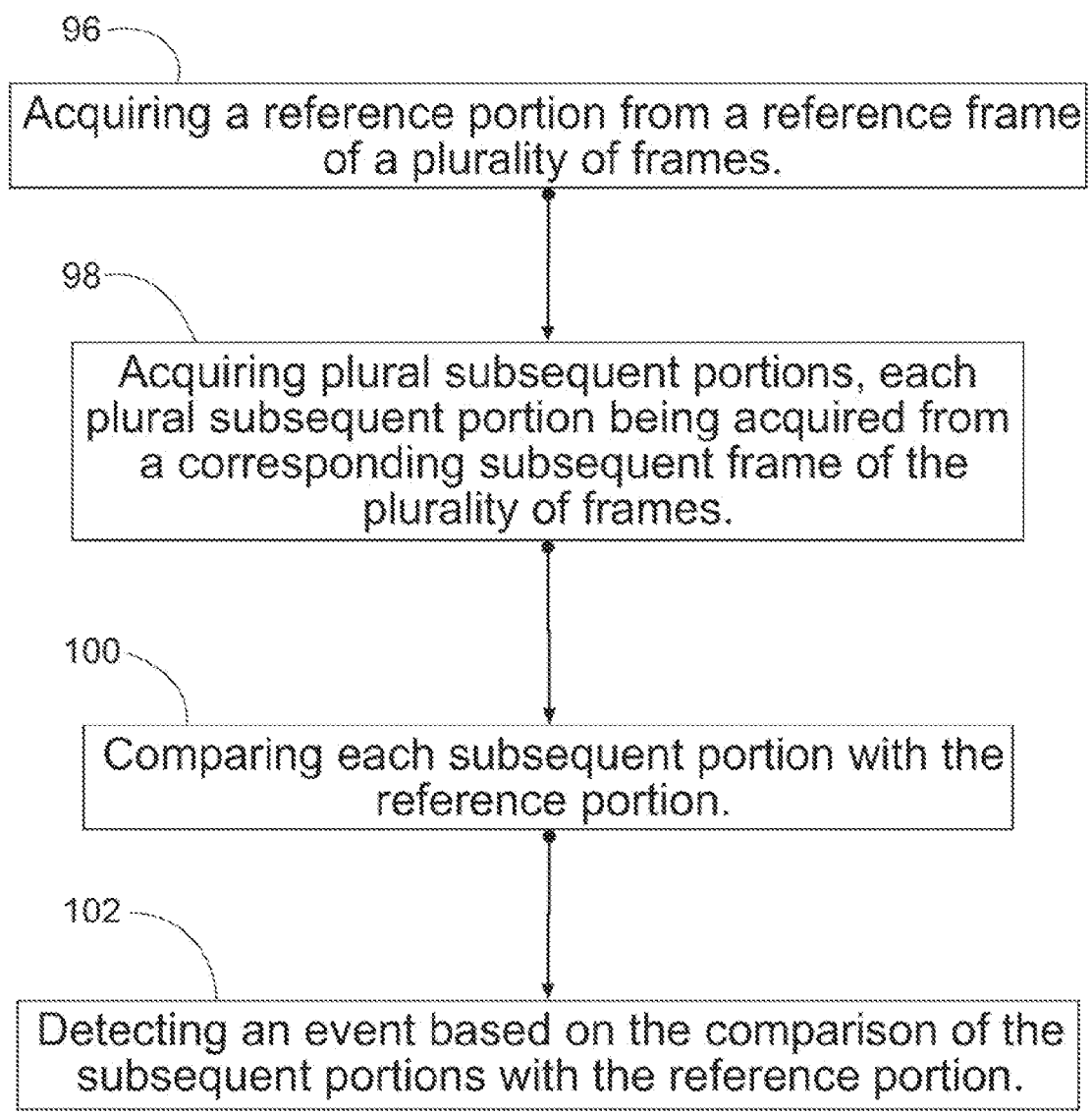
FIG. 12 is a flow diagram illustrating a method of analyzing a segment of video.

Referring to FIG. 12, a method of analyzing a segment of video comprising a plurality of frames is illustrated. The segment of video may be captured using a stationary video source. In step 96, a reference portion is acquired from a reference frame of the plurality of frames. Referring to FIG. 4, as previously mentioned, horizontal line portion 22 is taken from one of areas 40 that correspond to background scenes. Frame 30 is suitable for use as a reference frame, due to the fact that the background is unchanging and no event is occurring within the field of view of the camera. The pixel values of horizontal line portion 22 are sampled as a reference array at t=1 REFLINE(x,Y,1).

$$REFLINE(x, Y, 1) = \sum_{x=0}^{x=frame\ width} Frame\ Array(x, Y).$$

Y is the vertical height of the location where the reference portion is taken from the reference frame. In the example shown, Y=frame height/2. The reference portion acquired from frame 30 in step 96 may be acquired as horizontal line portion 22. Referring to FIG. 12, in step 98 plural subsequent portions are acquired, with each subsequent portion being acquired from a corresponding subsequent frame of the plurality of frames. In certain embodiments, the reference portion and the subsequent portions may be each acquired as at least part of one or more lines. Each line may be horizontal, vertical, diagonal, curved, or any other suitable type of curvilinear portion. In other embodiments, the steps of acquiring the reference portion and the subsequent portions comprise acquiring multiple portions of each respective frame. Because a single line is sensitive to the location from which the portion is taken, more than one sampled line can be extracted as a portion. This will enhance the event detection results and guarantee better performance. More over, additional lines or portions can be used to indicate, more accurately, object size and location with respect to camera position. An example of multiple portions may include a horizontal line and a vertical line. In other embodiments, the reference portion may be acquired from a location on the reference frame, with each subsequent portion being acquired from the same location on the corresponding subsequent frame. In other embodiments, subsequent frames from the plurality of frames occur at a regular time interval. For example, the plurality of frames may include ten subsequent frames for every one second of footage, giving a regular time interval of a tenth of a second in between frames. A further example may include using a regular time interval of one-fifth of a second. The plurality of frames may or may not include all the frames in the segment of video. Referring to FIGS. 2 and 6, horizontal line portions 16 and 24 provide examples of subsequent portions that are acquired from subsequent frames (frames 30 and 32, respectively). In the embodiment disclosed, a subsequent portion is acquired of each corresponding subsequent frame of the plurality of frames.

Referring to FIG. 12, in step 100 each subsequent portion is compared with the reference portion. Comparing each subsequent portion with the reference portion may comprise computing a pixel difference PIXDIFF between the subsequent and reference portions.

Referring to FIG. 12, in step 102 an event is detected based upon the comparison of the subsequent portions with the reference portion. In some embodiments, detecting an event may comprise detecting a plurality of events based on the comparison of the subsequent portions with the reference portion. The plurality of events may comprise the detection of an automobile, a pedestrian, a cyclist, an animal, or a background. In other embodiments, a first event may be detected when the pixel difference PIXDIFF is greater than a first threshold. Additionally, a second event may be detected when the pixel difference PIXDIFF is less than the first threshold and greater than a second threshold.

The first threshold and the second threshold may be determined using a reference pixel variation computed by a comparison of the pixel differences REFPIXDIFF between the reference portion and a plurality of subsequent portions, to eliminate the camera noise. This may be accomplished by taking the sum of absolute differences SAD of the pixels between each portion of the plurality of subsequent portions and the reference portion. Each SAD is calculated by summing the absolute values of the difference between each pixel in the reference portion and the corresponding pixel in the subsequent portion being used for comparison.

$$REFPIXDIFF = MAX(REFLINE(x, Y, 1) - REFLINE(x, Y, t))_{t=2, t=2+n}$$

The reference pixel variation may be equal to the highest individual SAD value calculated using the plurality of subsequent portions. Alternatively, other statistical methods may be used to calculate the reference pixel variation. The plurality of subsequent portions may be portions taken from subsequent frames from which no event is detected. Referring to FIG. 3, the plurality of subsequent portions may be portions occurring just after (above) horizontal line portion 22. In order to accurately calculate the reference pixel variation, the plurality of subsequent portions may be portions taken from subsequent frames from which no event is detected. The number of subsequent portions (n) in the plurality of subsequent portions used to calculate the reference pixel variation may be, for example five or twenty subsequent portions. In some embodiments, the first threshold and the second threshold are multiples of the reference pixel variation. The first threshold is used to detect large changes in the scanned line and the second threshold to detect huge changes. Accordingly, the first threshold may detect a large object passing through the field of view, whereas the second threshold may detect a small object passing through.

$$PIXDIFF(t) = \sum_{x=0}^{x=frame\ width} REFLINE(x, Y, 1) - LINE(x, Y,)$$

IF PIXDIFF(t)>SECOND THRESHOLD, small object
IF PIXDIFF(t)>FIRST THRESHOLD, big object In other embodiments, the second threshold comprises at least one and a half times the reference pixel variation. For example, the first threshold may be three times the reference pixel variation, and the second threshold may be one and a half times the reference pixel variation. Alternatively, other values may be possible. The purpose of having more than one type of event is to discern between different events. The first event may correspond to car 46, or alternatively, any type of automobile. The second event may correspond to a pedestrian or a cyclist. Alternatively, other events corresponding to other occurrences in the field of view of the camera may be detected. The type of event detected is based on the computed pixel difference between the subsequent portion of the frame where the event is occurring, and the reference portion of the reference frame where no event is occurring. Referring to FIG. 3, horizontal line portion 16 has a greater pixel difference than horizontal line portion 24, and can thus be calculated to be an occurrence of a first event. This way, events can be categorized by the type of event that is occurring within the corresponding frames. In other embodiments, a first event may be detected when the respective pixel differences of a plurality of adjacent subsequent portions are greater than the first or second threshold. The plurality of adjacent subsequent portions may comprise, for example, at least five or ten subsequent portions. This will stop instantaneous frames containing, for example, a blip in the video feed or sudden changes of illumination and contrast from being detected as the occurrence of an event, and will make the video analysis method more efficient. The method shown in FIG. 12 may be used as part of a method, for example, for video, roadway or parking lot surveillance. In the embodiment of roadway surveillance, the method may be used to identify an automobile. Additionally, detecting the event may further comprise identifying characteristics of the automobile. Characteristics of the automobile may comprise speed, color, direction of travel, or license plate number, as a few examples.

Figure 13:
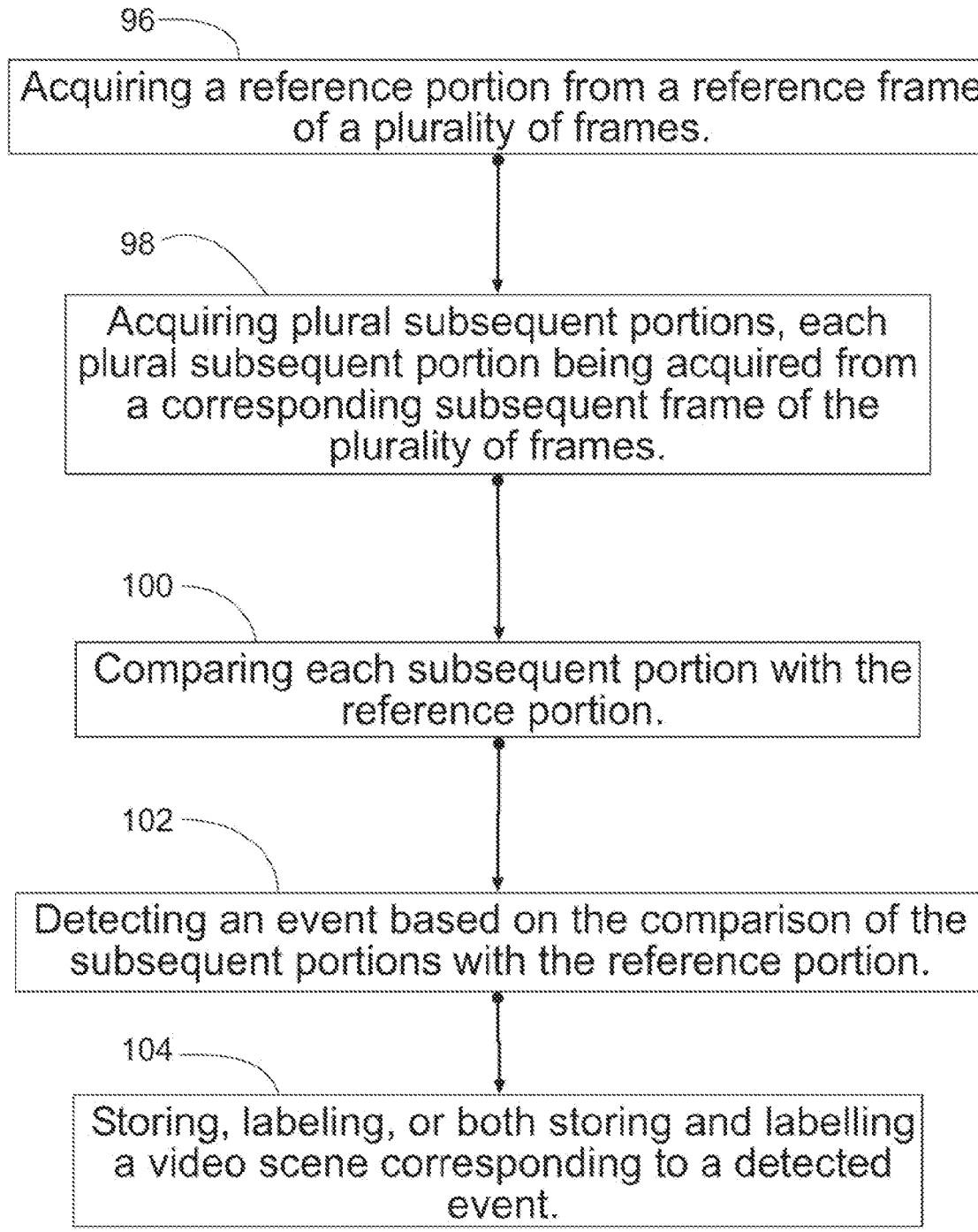
FIG. 13 is a flow diagram illustrating a method of analyzing a segment of video and storing/labeling a video scene.

Referring to FIG. 13, an alternative embodiment of the method of FIG. 12 is illustrated. In step 104, a video scene corresponding to a detected event may be stored, labeled, or both stored and labeled. This way, video footage that captures only notable events, such as a speeding car or an accident may be stored, while unimportant footage containing no events may be discarded. Additionally, by labeling video scenes that contain events, a segment of video may be easily analyzed, with a user easily locating and viewing only the noteworthy labeled scenes. The video scene may include at least one frame corresponding to a detected event. This method may be used to optimize video camera footage, such as security camera footage, or to edit video, as a few examples. Additionally, this method may be used to selectively record only video scenes corresponding to events occurring. By selectively recording video scenes, much less space is required for storing video. The selective recording may be triggered upon event detection.

Figure 14:
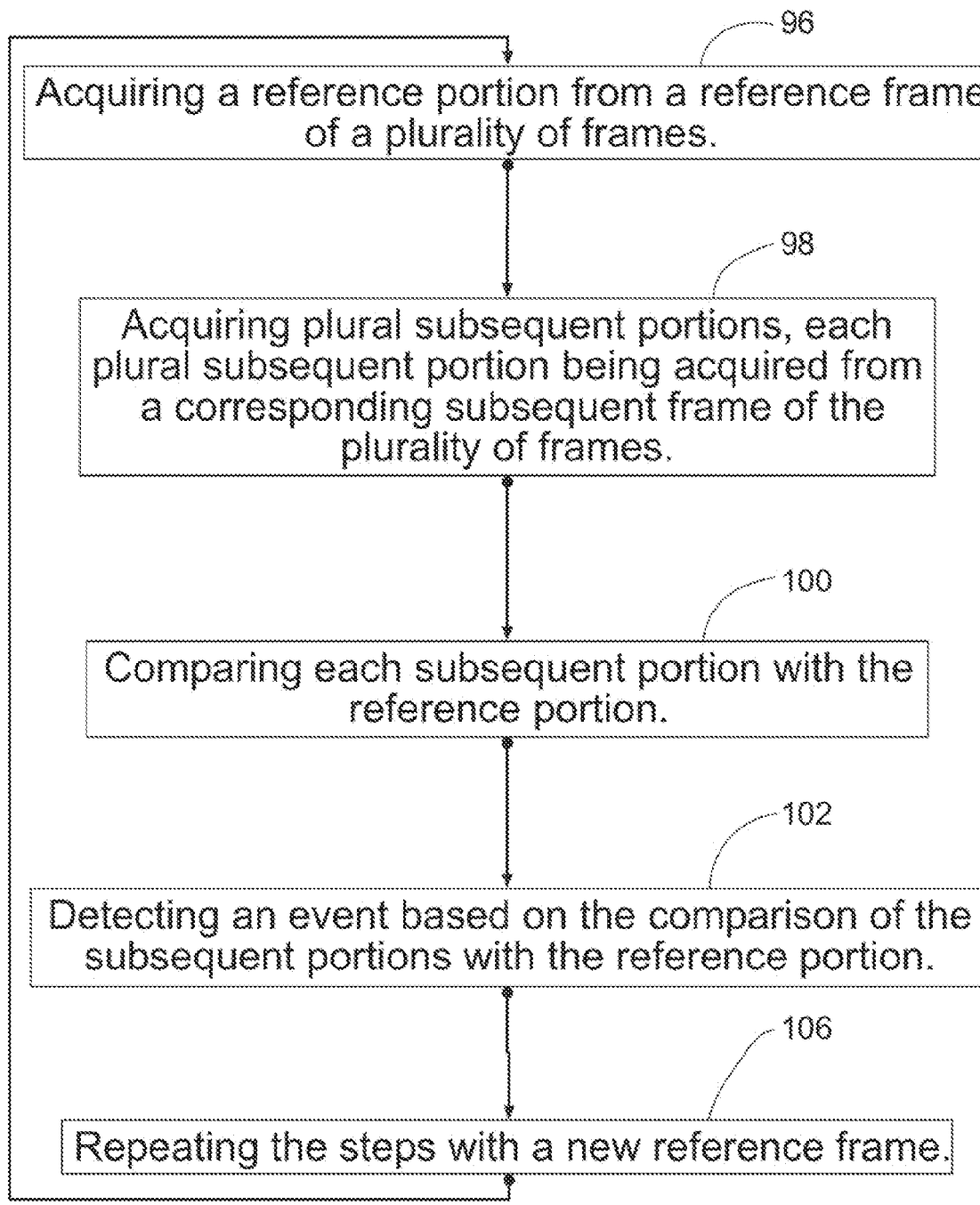
FIG. 14 is a flow diagram of a method of analyzing a segment of video, and repeating the steps.

Referring to FIG. 14, an additional embodiment of the method of FIG. 12 is illustrated. In step 106, the method steps (step 96, step 98, step 100, and step 102) are repeated with a new reference frame. Step 106 may be carried out upon the detection of an event lasting longer than a period of time, for example a period of time longer than sixty or one hundred and twenty seconds. The detected event may be the first or second event. Over time, the background scene in the field of view of the camera will be changing, due to, for example, changing weather or lighting conditions. Because of the changing background, each subsequent scene will, eventually, have a pixel difference great enough to detect an event, even those with no events occurring within. When this occurs, the method steps must be repeated, in order to establish a new reference portion.

Figure 15:
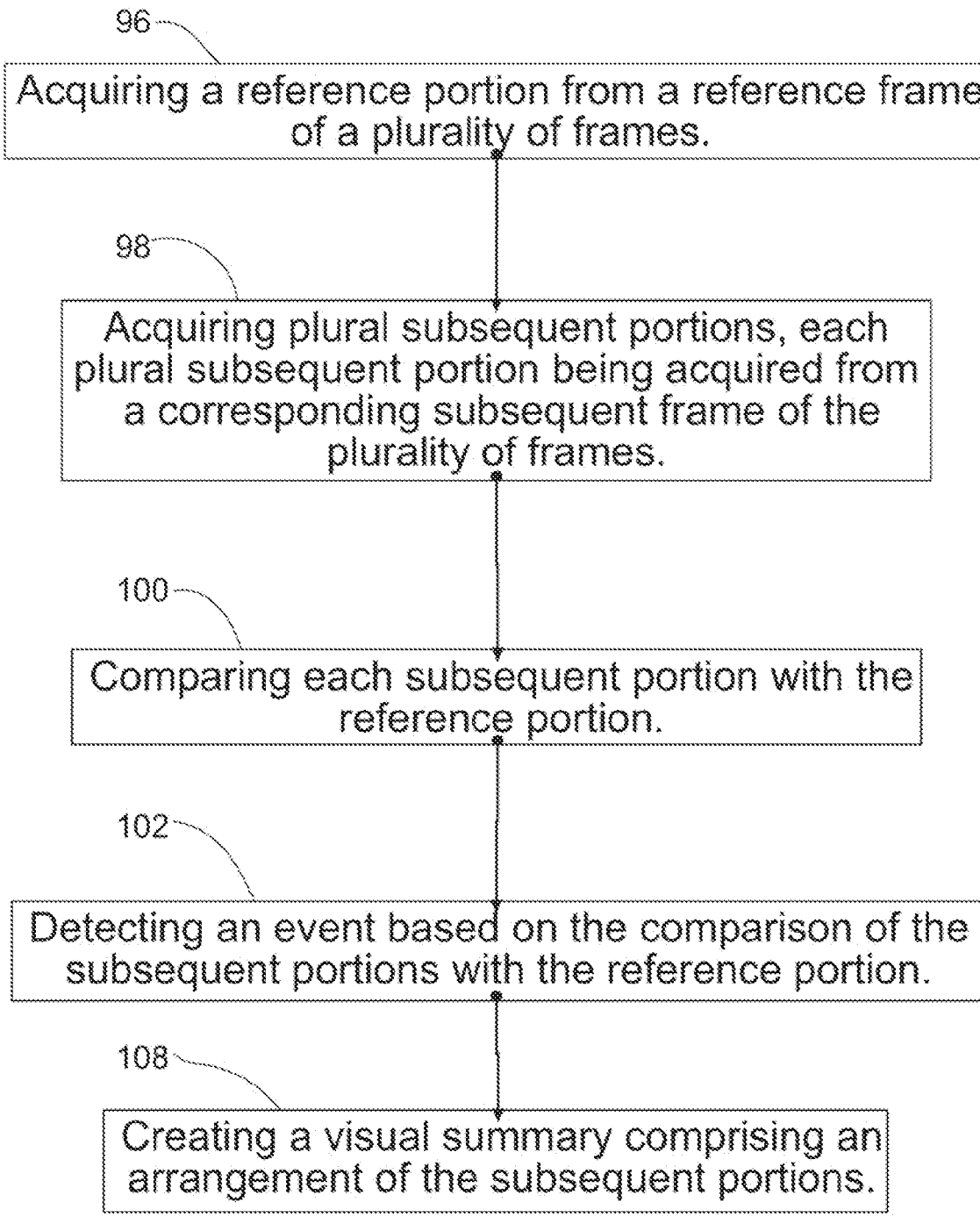
FIG. 15 is a flow diagram of a method of analyzing a segment of video and creating a visual summary.

Referring to FIG. 15, an additional embodiment of the method of FIG. 12 is illustrated. In step 108, a visual summary may be created comprising an arrangement of the subsequent portions. Such a visual summary may look like, for example, visual summaries 14 (shown in FIG. 1) or 54 (shown in FIG. 7). The visual summary may be linked to the stored footage of video scenes corresponding to events only, or to the entire segment of video. Such a visual summary will aid in quickly and efficiently analyzing the segment of video.

Figure 16:
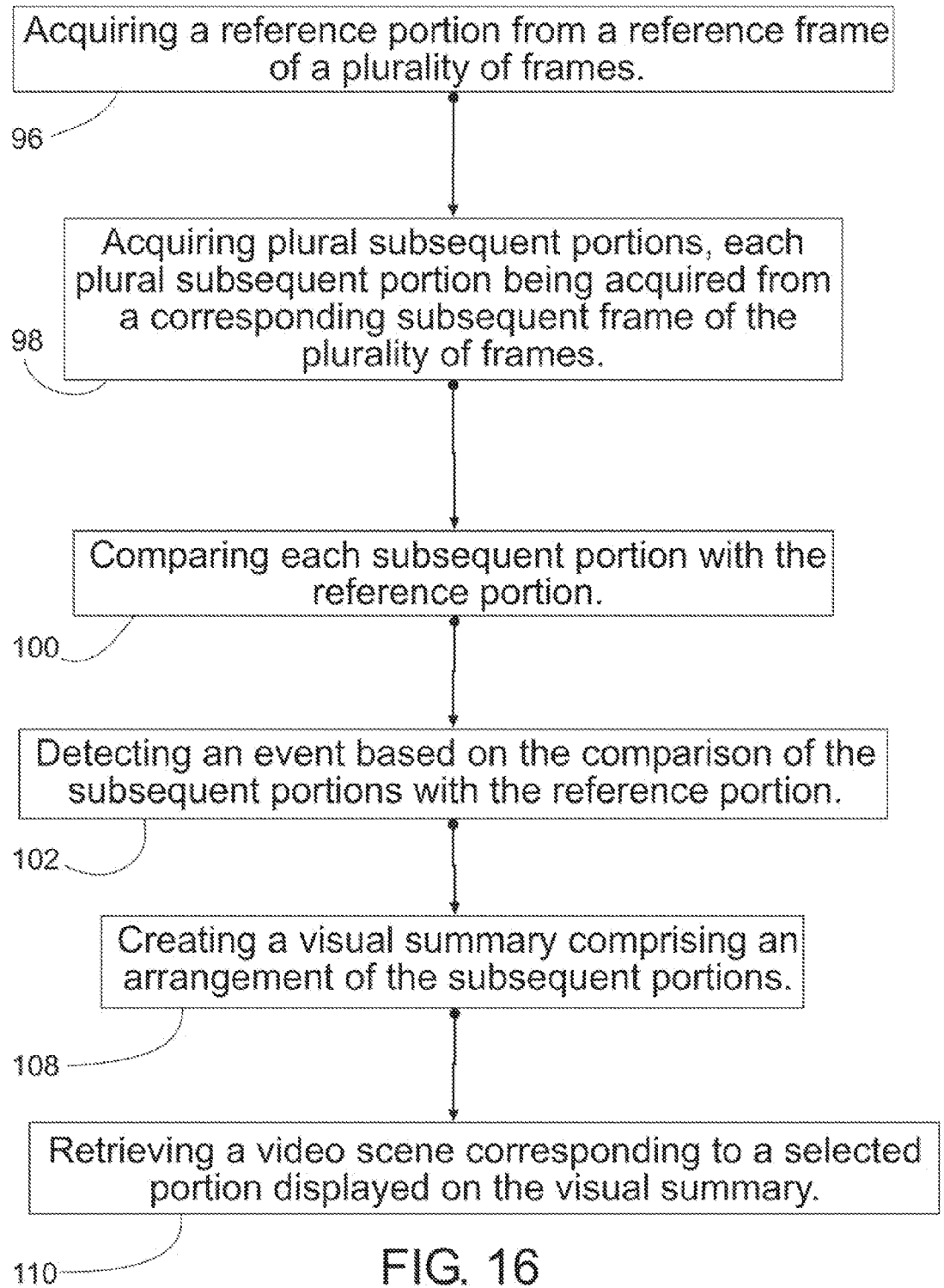
FIG. 16 is a flow diagram of a method of analyzing a segment of video, creating a visual summary, and retrieving a video scene.

Referring to FIG. 16, an alternative embodiment of the method of FIG. 15 is illustrated. In step 110, a video scene corresponding to a selected portion displayed on the visual summary is retrieved. This may be accomplished in a similar fashion as that described for the embodiments of FIGS. 1-6 above. It is advantageous to provide a visual summary in step 108 that has the subsequent portions arranged in successive order. This way, video can be chronologically analyzed. Additionally, the subsequent portions may correspond to subsequent frames taken at regular intervals from the segment of video. The regular time intervals may comprise the time interval between each subsequent frame, for example one-thirtieth of a second.

Figure 21:
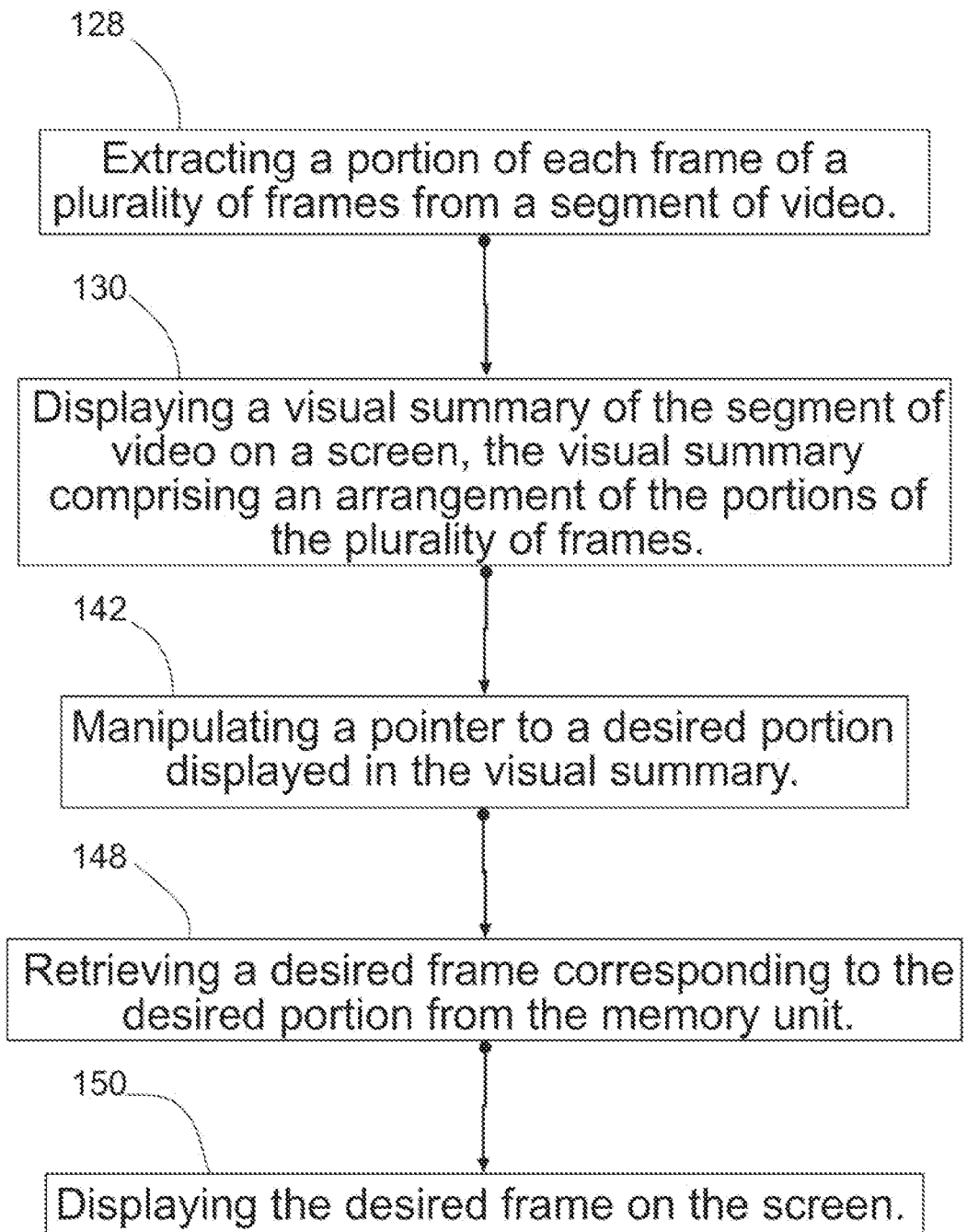
FIG. 21 is a flow diagram of a method of analyzing a segment of video stored on a memory unit.
Figure 26:
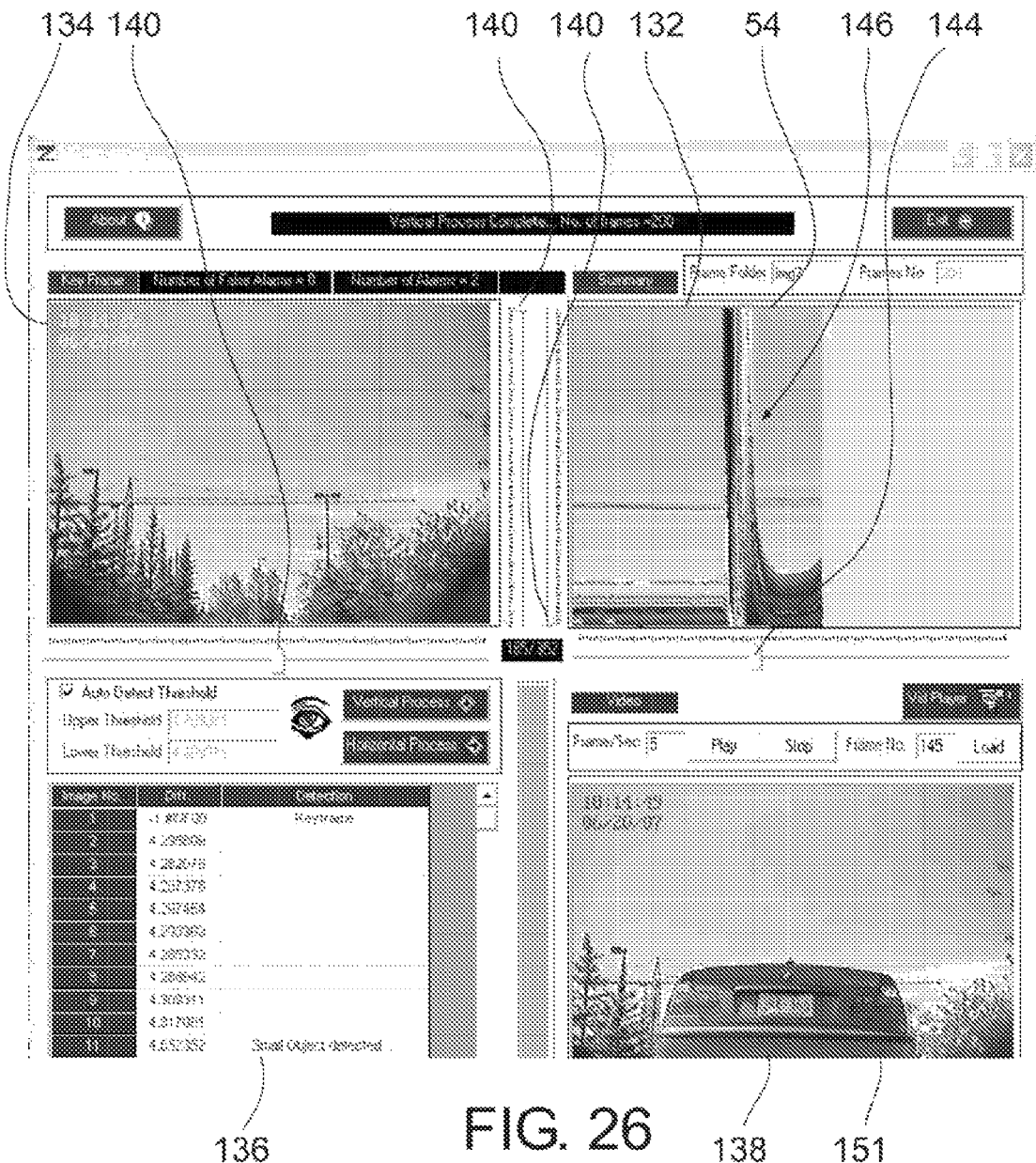
FIG. 26 is a view illustrating an embodiment of a visual summary of a segment of video.

Referring to FIG. 21, a method of analyzing a segment of video stored on a memory unit is illustrated. In step 128, a portion of each frame of a plurality of frames from the segment of video is extracted. In step 130, a visual summary of the segment of video is displayed on a screen, the visual summary comprising an arrangement of the portions of the plurality of frames. Referring to FIG. 26, a screenshot from a system used to create visual summary 54 is shown. The system may be a software program configured to achieve the method steps disclosed for analyzing a segment of video. The screenshot shows an interface that contains a visual summary window 132, a reference frame window 134, a frame analysis window 136, and a desired frame window 138. Frame analysis window 136 may display, for example, various data regarding REXPIXDIFF values, or detected events. Visual summary window 132 is used to display video summary 54. Visual summary 54 may be created on the fly using a stream of video from a camera, or after the fact using a stored segment of video. In some embodiments, each portion may be acquired at a location on a corresponding frame, with each location (on subsequent frames) being the same location. Visual summary window 132 and reference frame window 134 may comprise various selectors 140 that may be used to adjust, for example, the extraction location or orientation of the portion to be extracted from each frame, the extraction location of multiple portions extracted from each frame, or the rate of sampling frames from the segment of video. Referring to FIG. 21, in step 142 a pointer is manipulated to a desired portion displayed in the visual summary. Referring to FIG. 26, visual summary window 132 may include a scene selector 144. Scene selector 144 functions similarly to scene selector 36 described above. Scene selector 144 may be manipulated as a pointer to highlight a desired portion 146 displayed in visual summary 54. Typically, this manipulation may be done using a standard mouse. This method is very rapid since there is little actual processing by the computer to create visual summary 54.

Referring to FIG. 21, in step 148 a desired frame corresponding to the desired portion is retrieved from the memory unit. In step 150 the desired frame is displayed on the screen. Referring to FIG. 26, a desired frame 151 corresponding to desired portion 146 is displayed in desired frame window 138. Desired frame 151 may be retrieved by manipulating scene selector 144 to select desired portion 146. Typically this selection may be accomplished by clicking a mouse button. Desired frame 151 is then displayed. Alternatively, a desired frame may be displayed with selecting a desired portion, but instead by merely positioning scene selector 144 over a desired portion.

Figure 22:
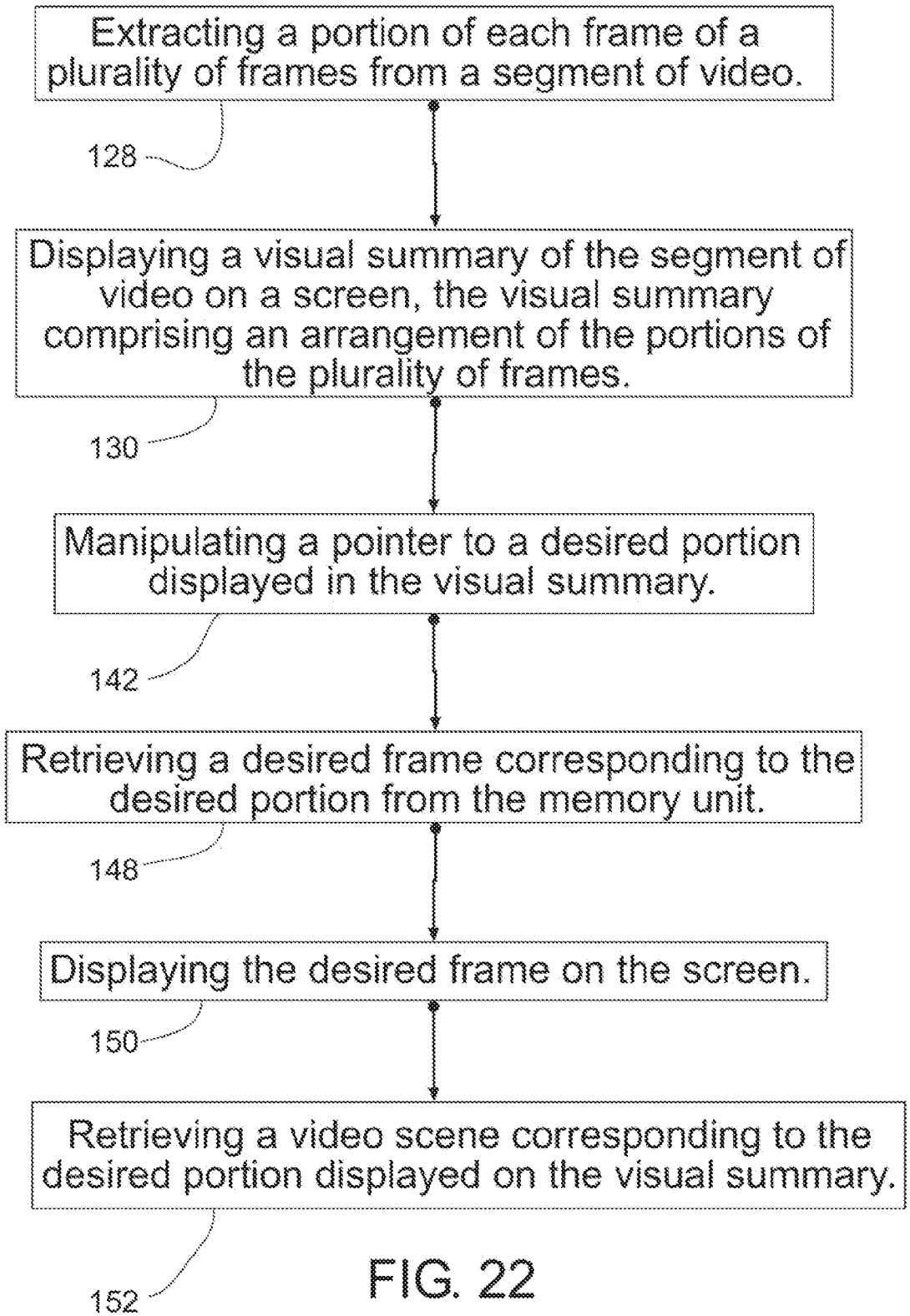
FIG. 22 is a flow diagram of a method of analyzing a segment of video and retrieving a video scene.

Referring to FIG. 22, an embodiment of the method described for FIG. 21 is illustrated. In step 152 a video scene corresponding to the desired portion displayed on the visual summary is retrieved. Referring to FIG. 26, desired frame window 138 may be used to display a video scene corresponding to desired portion 146. A user may select desired portion 146, and the system may then retrieve a video scene comprising video that contains desired frame 151. A user may then select to watch or scroll through the video scene, in standard fashion.

Figure 23:
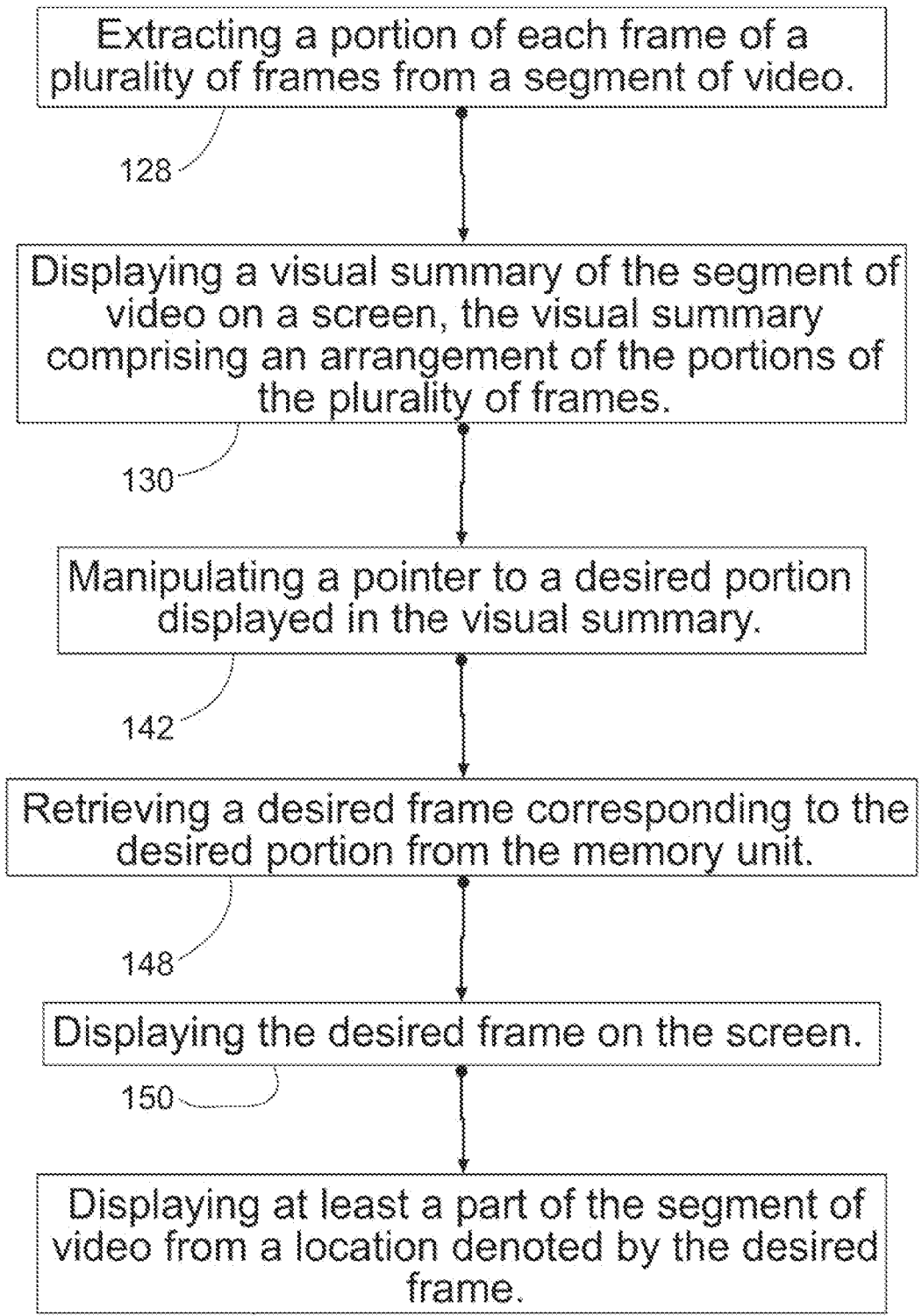
FIG. 23 is a flow diagram of a method of analyzing a segment of video and displaying the video from the location denoted by the desired portion.

Referring to FIG. 23, another embodiment of the method described for FIG. 21 is illustrated. In step 154 at least a part of the segment of video from a location denoted by the desired frame is displayed. Referring to FIG. 26, a user may select desired portion 146, and the system may retrieve at least a part of the segment of video. Desired frame window 138 will then display desired frame 151, with the option to watch or scroll through the segment of video from that location.

Figure 24:
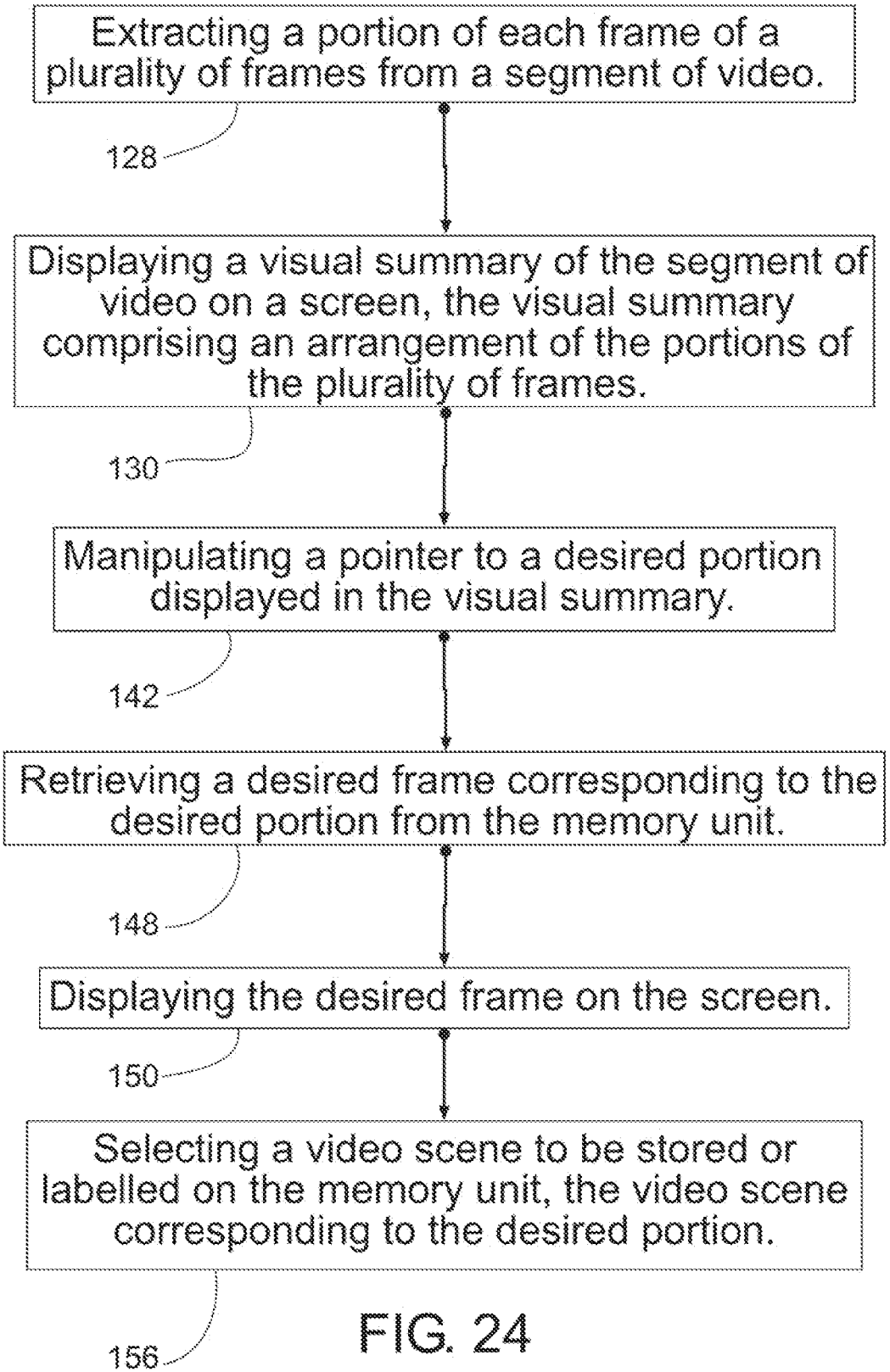
FIG. 24 is a flow diagram of a method of analyzing a segment of video and selecting a video scene to be labeled or stored.

Referring to FIG. 24, a further embodiment of the method described for FIG. 21 is illustrated. In step 156, a video scene is selected to be stored or labeled on the memory unit, the video scene corresponding to the desired portion. Referring to FIG. 26, a user may select a sequence of frames, and selectively store the corresponding video scene on the memory unit. Alternatively, the user may apply a label to the video scene, so that a future observer of the segment of video may easily search for and find the labeled scene. Scenes may be stored/labeled according to the occurrence of an event.

Figure 25:
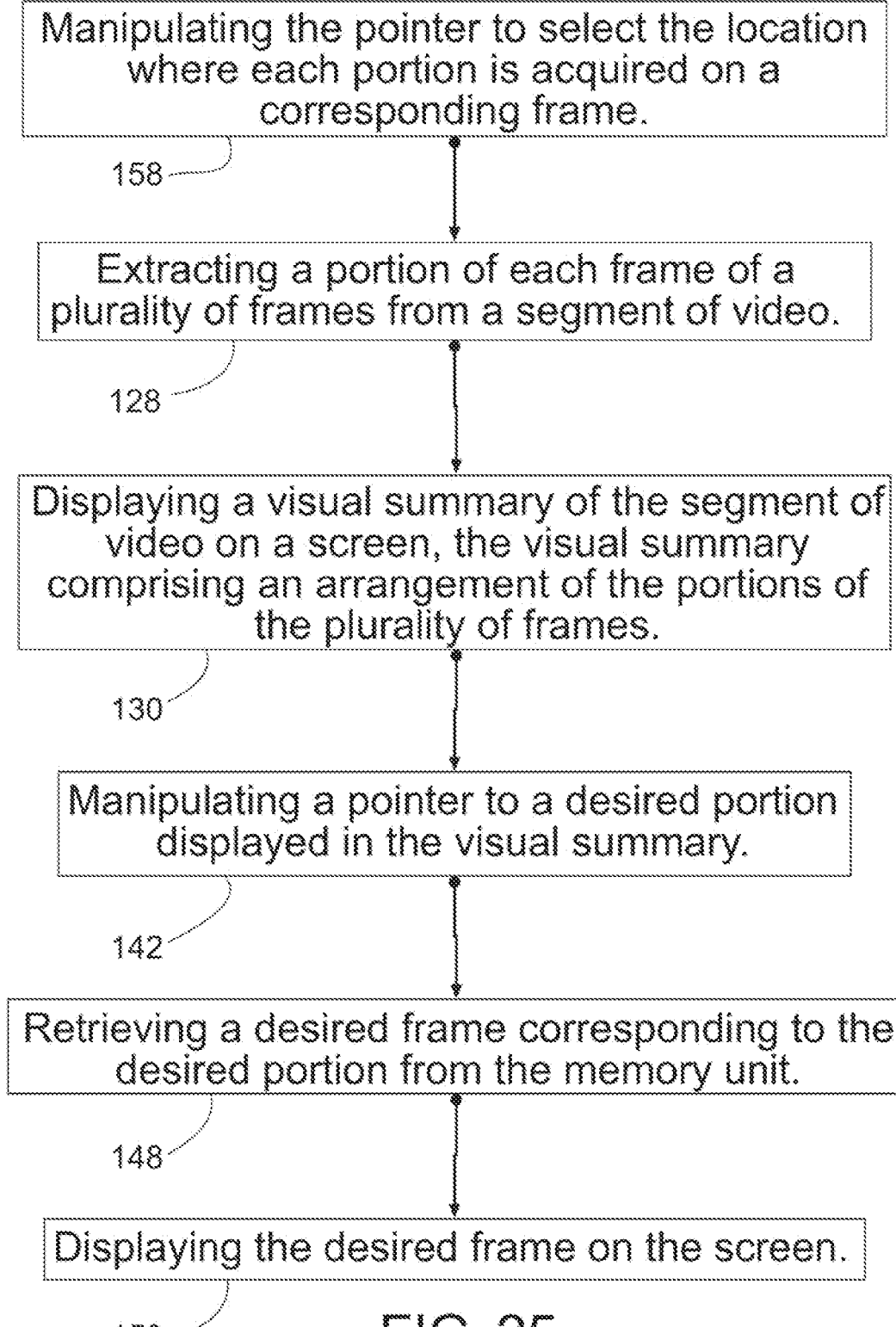
FIG. 25 is a flow diagram of a method of analyzing a segment of video and selecting a location on each frame for portion extraction.

Referring to FIG. 25, a further embodiment of the method described for FIG. 21 is illustrated. In step 158, the pointer is manipulated to select the location where each portion is acquired on a corresponding frame. Referring to FIG. 26, this may be accomplished using selectors 140. The type of portion, including the orientation, for example a horizontal or vertical line, may be selected, as well as the location of the line or portion on the frame. This may be done according to any of the methods described throughout this document.

In video surveillance huge amounts of data are stored that don't contain any important information. This method provides an automated summary tool to describe the video content and quickly provide a desired scene to the users in short time.

Immaterial modifications may be made to the embodiments described here without departing from what is claimed.

What is claimed is:

1. A method of analyzing a segment of video comprising frames, the frames comprising pixels, the method comprising:
    extracting a respective line portion from a location on each frame of a plurality of frames of the segment of video, the location on each frame of the plurality of frames being defined by x-y pixel coordinates, each respective line portion comprising a portion of pixels of the respective frame of the plurality of frames, in which one of the frames of the plurality of frames is a reference frame;
    detecting a plurality of the line portions as corresponding to an object based on a comparing a measure of the differences of the pixels of the line portion of the plurality of line portions and the corresponding pixels of the reference frame to multiple thresholds, in which the multiple thresholds are determined using a reference pixel variation computed by a comparison of pixel differences between the line portion of the reference frame and a plurality of compared line portions of the plurality of frames; and
    determining a property of an event based on the plurality of line portions corresponding to the object, in which determining the property of the event comprises determining a size of the object based on the number of the multiple thresholds exceeded by the measure of the differences of the pixels of the line portion of the plurality of line portions and the corresponding pixels of the reference frame.

2. The method of claim 1 wherein the step of extracting the respective line portion from a location on each frame of the plurality of frames comprises extracting multiple line portions of each frame of the plurality of frames.

3. The method of claim 1 wherein detecting a plurality of the line portions as corresponding to an object comprises detecting a set of the line portions from a location on each frame of the plurality of frames as corresponding to a plurality of objects.

4. The method of claim 1 wherein detecting a plurality of line portions as corresponding to an object comprises detecting a plurality of line portions as corresponding to a plurality of objects based on a comparison of the pixels of the plurality of line portions to corresponding pixels of the reference frame.

5. The method of claim 1 in which the measure of the difference of the pixels is a sum of pixel differences.

6. The method of claim 1 in which the plurality of line portions is detected as corresponding to the object based on the measure of the differences of the pixels of the line portion of the plurality of line portions and the corresponding pixels of the reference frame being above a threshold of the multiple thresholds for at least a predetermined number of frames.

7. The method of claim 1 in which the multiple thresholds are determined by a comparison of the reference frame to a set of frames in which no event is detected.

8. The method of claim 7 in which the comparison of the reference frame to a set of frames in which no event is detected comprises determining a sum of absolute differences of the pixels of a line portion of the plurality of line portions from the set of frames in which no event is detected and the corresponding pixels of the reference frame.

9. The method of claim 1 wherein determining the property of the event corresponds to detection of at least a characteristic of a vehicle.

10. The method of claim 1, further comprising storing, labeling, or both storing and labelling a video scene corresponding to the event.

11. The method of claim 1 used as part of a method for video surveillance.

12. The method of claim 9 wherein characteristics of the vehicle comprise one or more of the existence, speed, color, direction of travel, or license plate number of the vehicle.

13. The method of claim 1, further comprising determining that the event lasts longer than a period of time and selecting a new frame as a reference frame and repeating the steps upon determining that the event lasts longer than the period of time.

14. The method of claim 1, further comprising arranging the respective line portions from the location on each frame of the plurality of frames to form a visual summary.

15. The method of claim 14, further comprising retrieving a video scene corresponding to a selected line portion displayed on the visual summary.

16. The method of claim 14, further comprising the steps of:
    manipulating a pointer to a desired line portion displayed in the visual summary;
    retrieving a desired frame corresponding to the desired line portion from a memory unit; and
    displaying the desired frame.

17. The method of claim 16 further comprising:
    displaying at least a part of the segment of video from a location denoted by the desired frame.

18. The method of claim 16 further comprising the step of selecting a video scene to be stored or labeled on the memory unit, the video scene corresponding to the desired line portion.

19. The method of claim 14, further comprising detecting a portion of the pixels of the visual summary as corresponding to the object, the portion of the pixels detected as corresponding to the object having a shape; and
    determining a property of the event based on the shape of the portion of the pixels of the visual summary corresponding to the object.

* * * * *

UNITED STATES PATENT AND TRADEMARK OFFICE
CERTIFICATE OF CORRECTION

| | | |
|---|---|---|
| PATENT NO. | : 8,630,497 B2 | Page 1 of 1 |
| APPLICATION NO. | : 11/945979 | |
| DATED | : January 14, 2014 | |
| INVENTOR(S) | : Badawy et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1071 days.

Signed and Sealed this
Second Day of June, 2015

Michelle K. Lee
*Director of the United States Patent and Trademark Office*